US012593046B2

(12) United States Patent　　　(10) Patent No.:　US 12,593,046 B2
Lee et al.　　　　　　　　　　　(45) **Date of Patent:　*Mar. 31, 2026**

(54) SUB-BLOCK DIVISION-BASED IMAGE ENCODING/DECODING METHOD AND DEVICE

(71) Applicant: Electronics and Telecommunications Research Institute, Daejeon (KR)

(72) Inventors: Ha Hyun Lee, Seoul (KR); Jung Won Kang, Daejeon (KR); Sung Chang Lim, Daejeon (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,885

(22) Filed: Jul. 9, 2024

(65) Prior Publication Data

US 2024/0364892 A1　　Oct. 31, 2024

Related U.S. Application Data

(63) Continuation of application No. 17/612,738, filed as application No. PCT/KR2020/007772 on Jun. 16, 2020, now Pat. No. 12,063,365.

(30) Foreign Application Priority Data

Jun. 17, 2019　(KR) ........................ 10-2019-0071417
Jun. 19, 2019　(KR) ........................ 10-2019-0072911
Jun. 25, 2019　(KR) ........................ 10-2019-0075803

(51) Int. Cl.
　　*H04N 19/132*　　(2014.01)
　　*H04N 19/105*　　(2014.01)
　　(Continued)

(52) U.S. Cl.
　　CPC ......... *H04N 19/132* (2014.11); *H04N 19/105* (2014.11); *H04N 19/119* (2014.11); *H04N 19/137* (2014.11); *H04N 19/176* (2014.11)

(58) Field of Classification Search
　　CPC .. H04N 19/105; H04N 19/119; H04N 19/132; H04N 19/137; H04N 19/176
　　See application file for complete search history.

(56) References Cited

U.S. PATENT DOCUMENTS

2013/0034167 A1　　2/2013　Zheng
2013/0301716 A1*　11/2013　Zheng ................. H04N 19/543
　　　　　　　　　　　　　　　　　375/240.12

(Continued)

FOREIGN PATENT DOCUMENTS

CN　　107690809 A　　2/2018
CN　　109644276 A　　4/2019
　　　　　(Continued)

OTHER PUBLICATIONS

Chen, Yunshan et al. (2014) "Adaptive partial distortion search using histogram ordering model," Chinese Journal of Scientific Instrument. vol. 35. No. 12. doi: 10.19650/j.cnki.cjsi.2014.s2.023.

(Continued)

*Primary Examiner* — Jeremiah C Hallenbeck-Huber
(74) *Attorney, Agent, or Firm* — BROADVIEW IP LAW, PC

(57)　　　　　　ABSTRACT

Disclosed herein are a video encoding/decoding method and apparatus. The video decoding method of the present disclosure includes: obtaining block partitioning information of a current block; based on the block partitioning information, partitioning the current block into a first sub-block and a second sub-block; deriving motion information of the first sub-block and motion information of the second sub-block respectively; based on the motion information of the first sub-block and the motion information of the second sub- (Continued)

block, generating a prediction sample of the first sub-block and a prediction sample of the second sub-block respectively; and through a weighted-sum of the prediction sample of the first sub-block and the prediction sample of the second sub-block, generating a prediction sample of the current block. Herein, the block partitioning information is index information indicating an index of a table including information indicating a plurality of predefined asymmetric partition shapes.

15 Claims, 16 Drawing Sheets

(51) Int. Cl.
H04N 19/119 (2014.01)
H04N 19/137 (2014.01)
H04N 19/176 (2014.01)

(56) References Cited

U.S. PATENT DOCUMENTS

| | | | | |
|---|---|---|---|---|
| 2014/0192876 A1* | 7/2014 | Yie | | H04N 19/176 |
| | | | | 375/240.12 |
| 2015/0010244 A1* | 1/2015 | Yie | | H04N 19/14 |
| | | | | 382/238 |
| 2019/0379914 A1* | 12/2019 | Misra | | H04N 19/186 |
| 2020/0195973 A1* | 6/2020 | Xu | | H04N 19/577 |
| 2020/0288150 A1* | 9/2020 | Jun | | H04N 19/46 |
| 2021/0120242 A1* | 4/2021 | Nam | | H04N 19/122 |

FOREIGN PATENT DOCUMENTS

| | | | |
|---|---|---|---|
| EP | 3414900 | A1 | 12/2018 |
| KR | 100772576 | B1 | 11/2007 |
| KR | 1020190046704 | A | 5/2019 |
| WO | 2016204478 | A1 | 12/2016 |
| WO | 2019/004283 | A1 | 1/2019 |
| WO | 2019/066602 | A1 | 4/2019 |

OTHER PUBLICATIONS

Benjamin Bross et al., Versatile Video Coding (Draft 5), Joint Video Experts Team (JVET) of ITU-T SG 16 WP 3 and ISO/IEC JTC 1/SC 29/WG 11, Document: JVET-N1001-v7, 14th Meeting: Geneva, CH, Mar. 19-27, 2019.
Miska M. Hannuksela et al., AHG12: Sub-picture-based picture partitioning and decoding, Joint Video Experts Team (JVET) of ITU-T SG 16 WP 3 and ISO/IEC JTC 1/SC 29/WG 11, Document: JVET-N0046, 14th Meeting: Geneva, CH, Mar. 19-27, 2019, Nokia.
Ru-Ling Liao et al., Non-CE4: Simplification of triangle partition and SBT combination, Joint Video Experts Team (JVET) of ITU-T SG 16 WP 3 and ISO/IEC JTC 1/SC 29/WG 11, Document: JVET-N0483-v2, 14th Meeting: Geneva, CH, Mar. 19-27, 2019, Alibaba Group 100000.
Yuan Yuan et al. Quadtree Based Nonsquare Block Structure for Inter Frame Coding in High Efficiency Video Coding, IEEE Transactions on Circuits and Systems for Video Technology vol. 22, No. 12, Dec. 2012, IEEE, USA, Searched (IPC), pp. 1707-1719.
Chen, Peisong et al., "Geometry Motion Partition," Joint Collaborative Team on Video Coding (JCT-VC) of ITU-T SG16 WP3 and ISO/IEC JTC1/SC29/WG11. Jul. 2010. doc: JCTVC-B049.
Toma, Tadamasa et al., "Description of SDR video coding technology proposal by Panasonic," Joint Video Experts Team (JVET) of ITU-T SG 16 WP 3 and ISO/IEC JTC 1/SC 29/WG 11. Apr. 2018. doc: JVET-J0020-v1.

* cited by examiner

FIG. 3

0:Planar
1:DC

FIG. 13

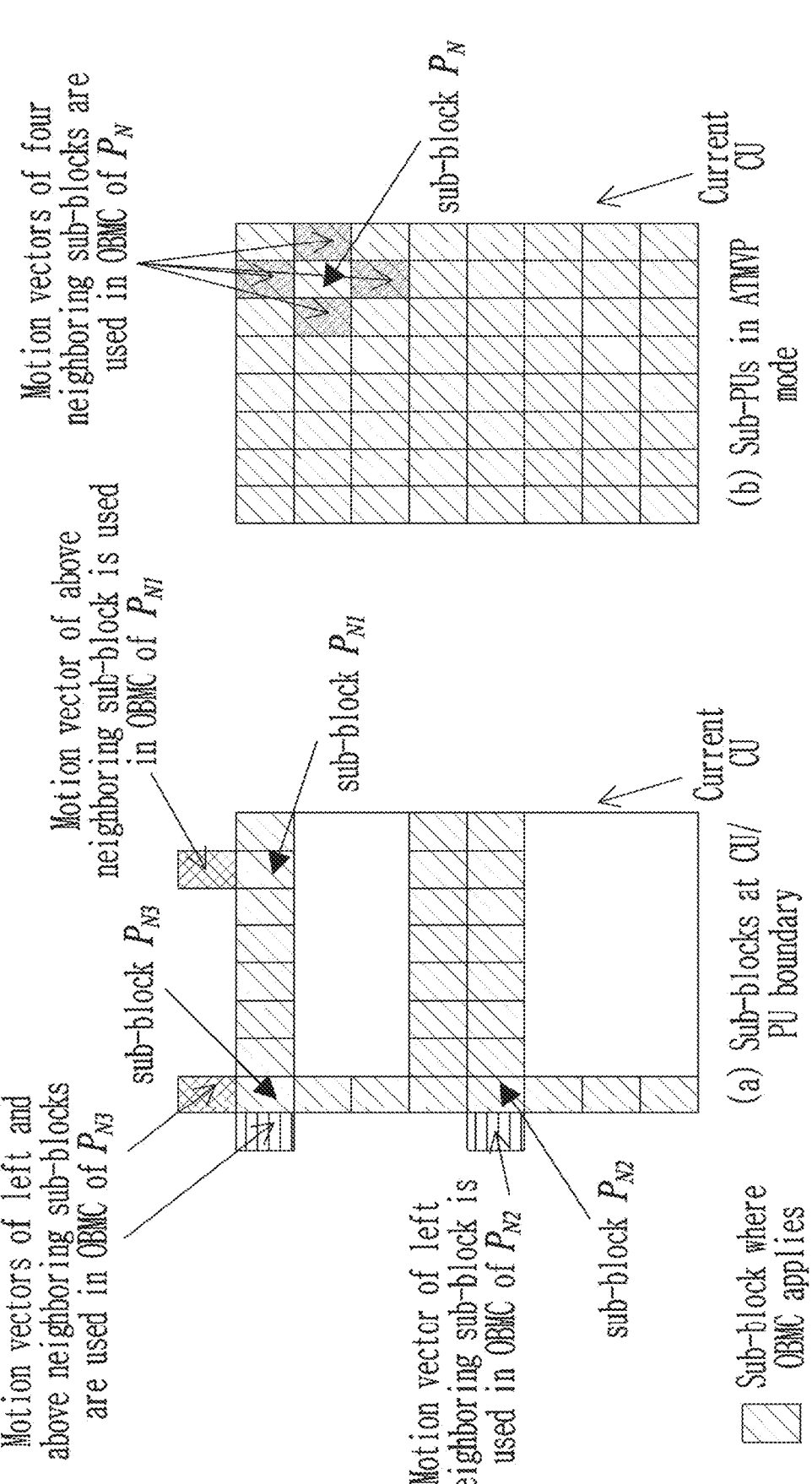

Motion vectors of four neighboring sub-blocks are used in OBMC of $P_N$ sub-block $P_N$ Current CU (b) Sub-PUs in ATMVP mode Motion vector of above neighboring sub-block is used in OBMC of $P_{N1}$ sub-block $P_{N1}$ Motion vectors of left and above neighboring sub-blocks are used in OBMC of $P_{N3}$ sub-block $P_{N3}$ Motion vector of left neighboring sub-block is used in OBMC of $P_{N2}$ sub-block $P_{N2}$ Current CU (a) Sub-blocks at CU/ PU boundary Sub-block where OBMC applies

FIG. 16
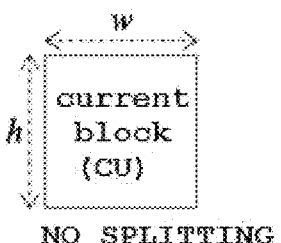
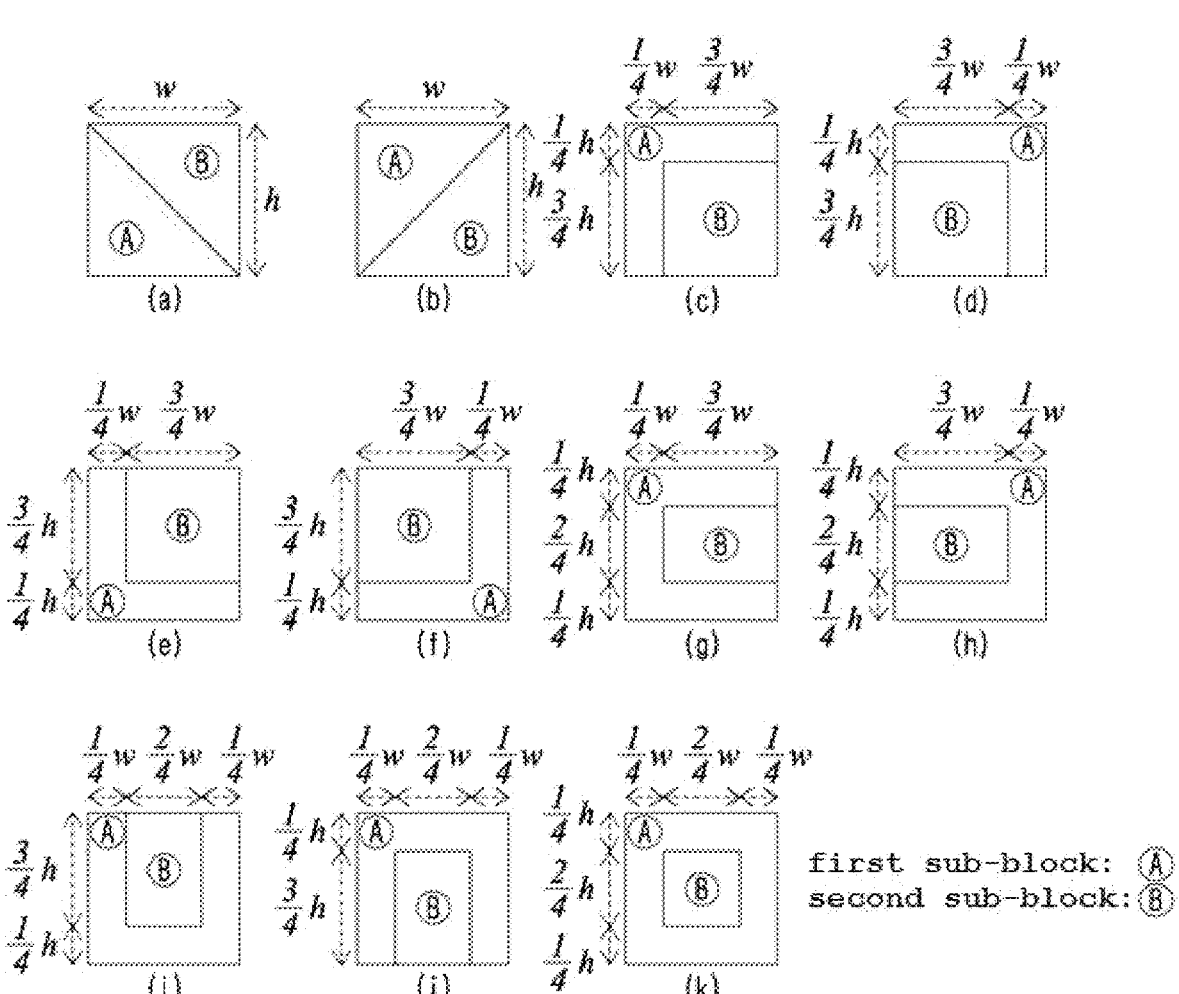

1

SUB-BLOCK DIVISION-BASED IMAGE ENCODING/DECODING METHOD AND DEVICE

CROSS-REFERENCE TO RELATED APPLICATIONS

This application is a continuation of U.S. application Ser. No. 17/612,738, filed on Nov. 19, 2021, which is a National Phase Entry Application of PCT Application No. PCT/KR2020/007772, filed on Jun. 16, 2020, which claims priority to Korean Patent Application No. 10-2019-0071417, filed on Jun. 17, 2019, Korean Patent Application No. 10-2019-0072911, filed on Jun. 19, 2019, and Korean Patent Application No. 10-2019-0075803, filed on Jun. 25, 2019, in the Korean Intellectual Property Office, the entire contents of which are hereby incorporated by reference in its entirety.

TECHNICAL FIELD

The present invention relates to a video encoding/decoding method, apparatus, and a recording medium storing a bitstream. More particularly, the present invention relates to a video encoding/decoding method and apparatus based on at least one asymmetric sub-block.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In a conventional video encoding/decoding method and apparatus, an encoding/decoding block always has a square shape or rectangle shape or both, and is partitioned into a quad-tree shape. Accordingly, encoding/decoding is performed with limited consideration of the local characteristics within a video.

DISCLOSURE

Technical Problem

An object of the present invention is to provide a method and apparatus for video encoding/decoding using various asymmetric sub-block partition structures.

In addition, another object of the present invention is to provide a method and apparatus for video encoding/decoding, wherein prediction is independently performed for asymmetric sub-blocks.

In addition, yet another object of the present invention is to provide an asymmetric sub-block based video encoding/decoding method and apparatus under at least one of a block partition structure with quad-tree followed by binary-tree, a combined quad-tree and binary-tree block partition structure, and a separated PU/TU tree block partition structure, thereby improving encoding/decoding efficiency.

In addition, yet another object of the present invention is to provide a video encoding/decoding method and apparatus for partitioning a current block into at least one or more asymmetric sub-blocks or performing different predictions for each of the asymmetric sub-blocks.

In addition, yet another object of the present invention is to provide a method and apparatus for storing motion information for a current block that is asymmetrically sub-divided.

In addition, yet another object of the present invention is to provide a recording medium storing a bitstream generated by a video encoding/decoding method or apparatus of the present invention.

Technical Solution

A method of decoding an image according to the present invention, the method may comprise, obtaining block partitioning information of a current block; based on the block partitioning information, partitioning the current block into a first sub-block and a second sub-block; deriving motion information of the first sub-block and motion information of the second sub-block respectively; based on the motion information of the first sub-block and the motion information of the second sub-block, generating a prediction sample of the first sub-block and a prediction sample of the second sub-block respectively; and generating a prediction sample of the current block through a weighted-sum of the prediction sample of the first sub-block and the prediction sample of the second sub-block, wherein the block partitioning information is index information indicating an index of a table including information indicating a plurality of predefined asymmetric partition shapes.

In the method of decoding an image according to the present invention, wherein the deriving of the motion information of the first sub-block and the motion information of the second sub-block respectively comprises: obtaining a merge index of the first sub-block and a merge index of the second sub-block respectively; generating a merge candidate list; deriving the motion information of the first sub-block by using the merge candidate list and the merge index of the first sub-block; and deriving the motion information of the second sub-block by using the merge candidate list and the merge index of the second sub-block.

In the method of decoding an image according to the present invention, wherein the merge candidate list is generated on the basis of the current block.

In the method of decoding an image according to the present invention, wherein the partitioning of the current block into the first sub-block and the second sub-block comprises partitioning the current block into the first sub-block and the second sub-block by a straight line. In the method of decoding an image according to the present invention, wherein the information indicating the plurality of predefined asymmetric partition shapes comprises at least one of angle information and distance information for the straight line.

In the method of decoding an image according to the present invention, wherein the first sub-block and the second sub-block have any one shape of a triangle, a rectangle, a trapezoid, and a pentagon.

In the method of decoding an image according to the present invention, further comprising storing at least one of the motion information of the first sub-block, the motion information of the second sub-block, and third motion information, wherein, when the motion information of the first sub-block and the motion information of the second sub-block refer to a reference picture in a same direction, the third motion information is derived as any one of the motion information of the first sub-block and the motion information of the second sub-block.

In the method of decoding an image according to the present invention, wherein the partitioning of a current block into a first sub-block and a second sub-block on the basis of the block partitioning information is not performed when a horizontal length and a vertical length of the current block are less than respective predetermined thresholds.

A method of encoding an image according to the present invention, the method may comprise, determining a block partitioning structure of a current block; based on the block partitioning structure, partitioning the current block into a first sub-block and a second sub-block; deriving motion information of the first sub-block and motion information of the second sub-block respectively; based on the block partitioning structure, encoding block partitioning information; and based on the motion information of the first sub-block and the motion information of the second sub-block, encoding a merge index of the first sub-block and a merge index of the second sub-block respectively, wherein the block partitioning information is index information indicating an index of a table including information indicating a plurality of predefined asymmetric partition shapes.

In the method of encoding an image according to the present invention, wherein the encoding of the merge index of the first sub-block and the merge index of the second sub-block respectively comprises: generating a merge candidate list; encoding the merge index of the first sub-block by using the merge candidate list and the motion information of the first sub-block; and encoding the merge index of the second sub-block by using the merge candidate list and the motion information of the second sub-block.

In the method of encoding an image according to the present invention, wherein the merge candidate list is generated on the basis of the current block.

In the method of encoding an image according to the present invention, wherein the partitioning of the current block into the first sub-block and the second sub-block comprises partitioning the current block into the first sub-block and the second sub-block by a straight line.

In the method of encoding an image according to the present invention, wherein the information indicating the plurality of predefined asymmetric partition shapes comprises at least one of angle information and distance information for the straight line.

In the method of encoding an image according to the present invention, wherein the first sub-block and the second sub-block have any one shape of a triangle, a rectangle, a trapezoid, and a pentagon.

In the method of encoding an image according to the present invention, further comprising storing at least one of the motion information of the first sub-block, the motion information of the second sub-block, and third motion information, wherein, when the motion information of the first sub-block and the motion information of the second sub-block refer to a reference picture in a same direction, the third motion information is derived as any one of the motion information of the first sub-block and the motion information of the second sub-block.

In the method of encoding an image according to the present invention, wherein the partitioning of a current block into a first sub-block and a second sub-block on the basis of the block partitioning information is not performed when a horizontal length and a vertical length of the current block are less than respective predetermined thresholds.

A computer-readable recording medium according to the present invention may store a bitstream generated by an image encoding method according to the present invention.

Advantageous Effects

According to the present invention, a video encoding/decoding method and apparatus using various asymmetric sub-block partition structures may be provided.

In addition, according to the present invention, a video encoding/decoding method and apparatus for performing prediction independently for each of partitioned asymmetric sub-blocks may be provided.

In addition, according to the present invention, a recording medium for storing a bitstream generated by a video encoding/decoding method or apparatus of the present invention may be provided.

In addition, according to the present invention, video encoding and decoding efficiency may be improved.

DESCRIPTION OF DRAWINGS

FIG. 3 is a view schematically showing a partition structure of an image when encoding and decoding the image.

FIG. 13 is a view showing a method of deriving inter-prediction information on the basis of overlapped block motion compensation (OMBC) according to an embodiment of the present invention.

FIG. 16 is a view showing asymmetric partitioning according to an embodiment of the present invention.

MODE FOR INVENTION

Figure 1:
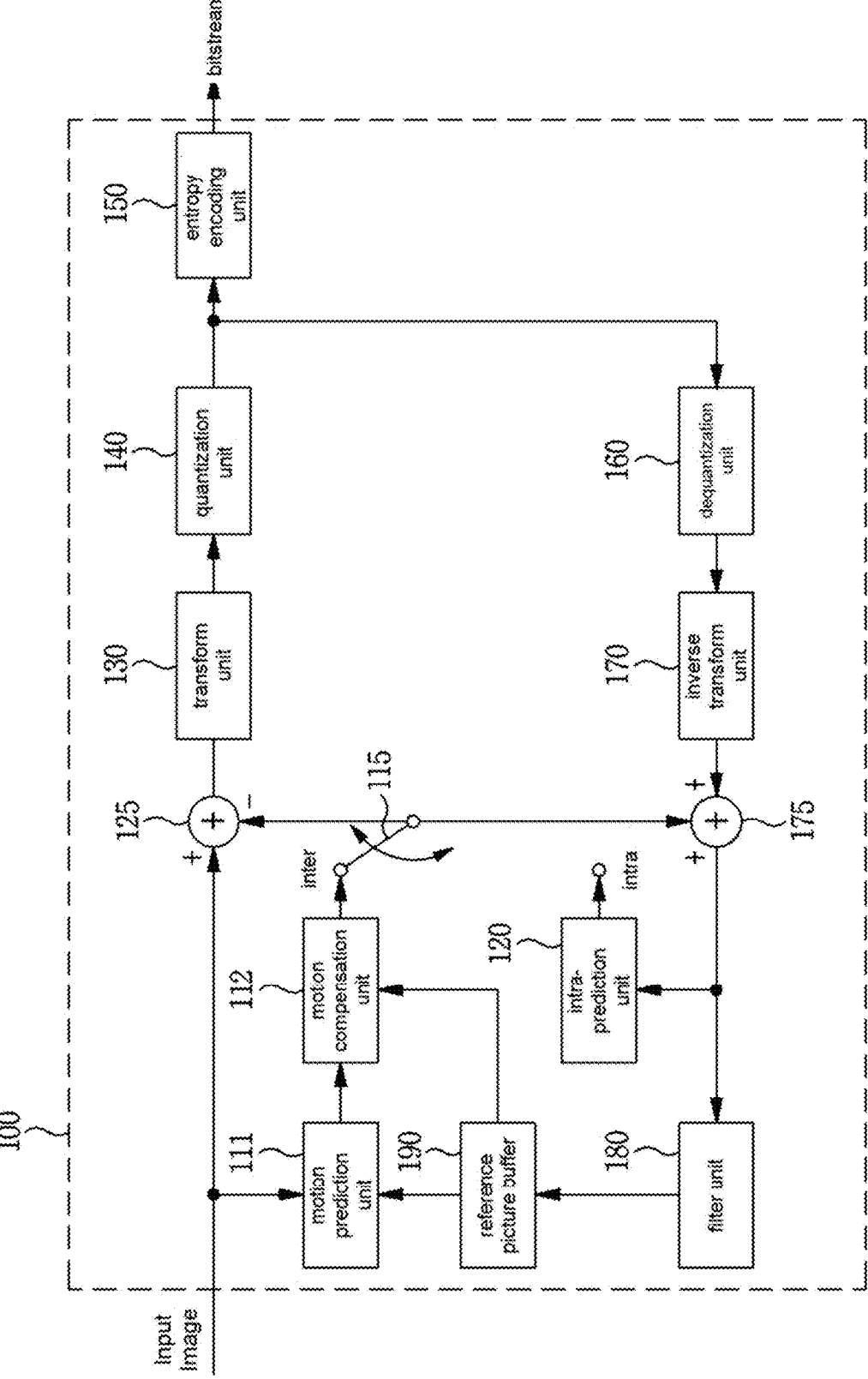
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional shape. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and shapes, and particularly, the shape of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the shape of a rectangle/square within a picture and may include one or more CTUs. In addition, at least one or more tiles/bricks/slices may be included within one subpicture.

The tile may be a region having the shape of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation.

A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a shape obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block shape coefficient into a one-dimensional vector shape by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination shape of a unit/block size, a unit/block depth, unit/block partition information, unit/block shape, unit/block partition structure, whether to partition of a quad-tree shape, whether to partition of a binary-tree shape, a partition direction of a binary-tree shape (horizontal direction or vertical direction), a partition shape of a binary-tree shape (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a shape and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
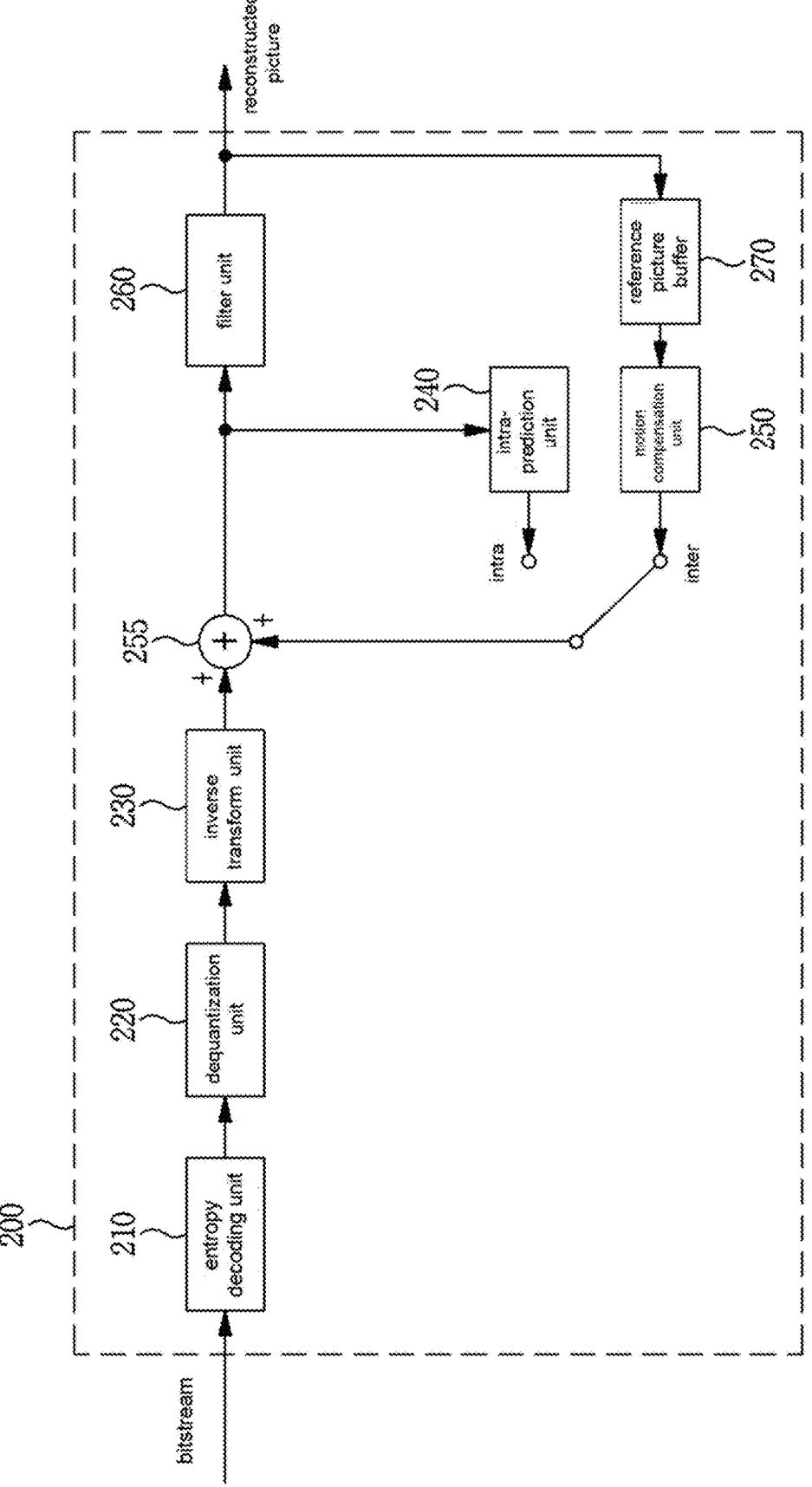
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level shape. Herein, an entropy decoding method may be an inverse-process of the entropy encoding method described above.

In order to decode a transform coefficient level (quantized level), the entropy decoding unit 210 may change a one-directional vector shape coefficient into a two-dimensional block shape by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
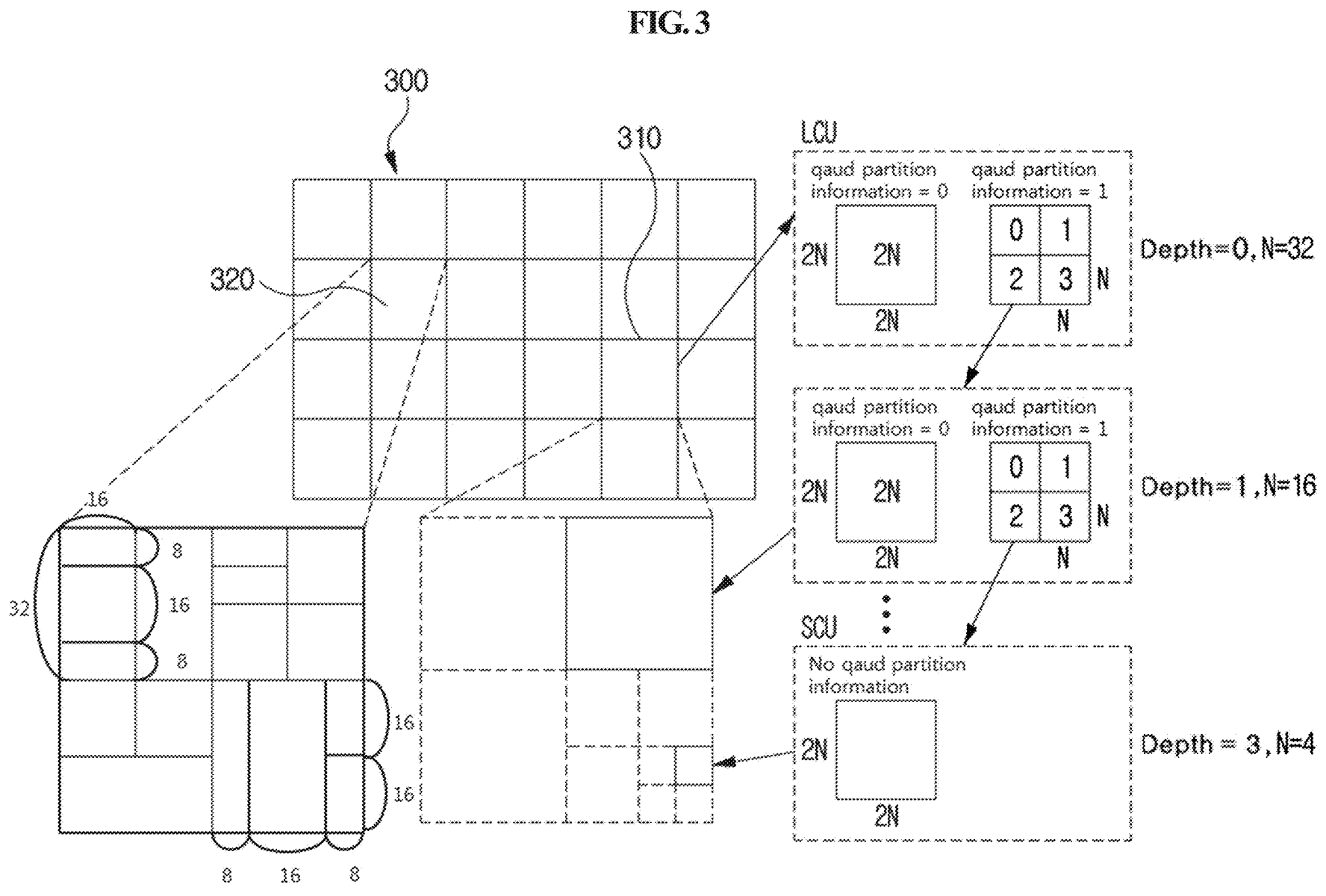

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree shape.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
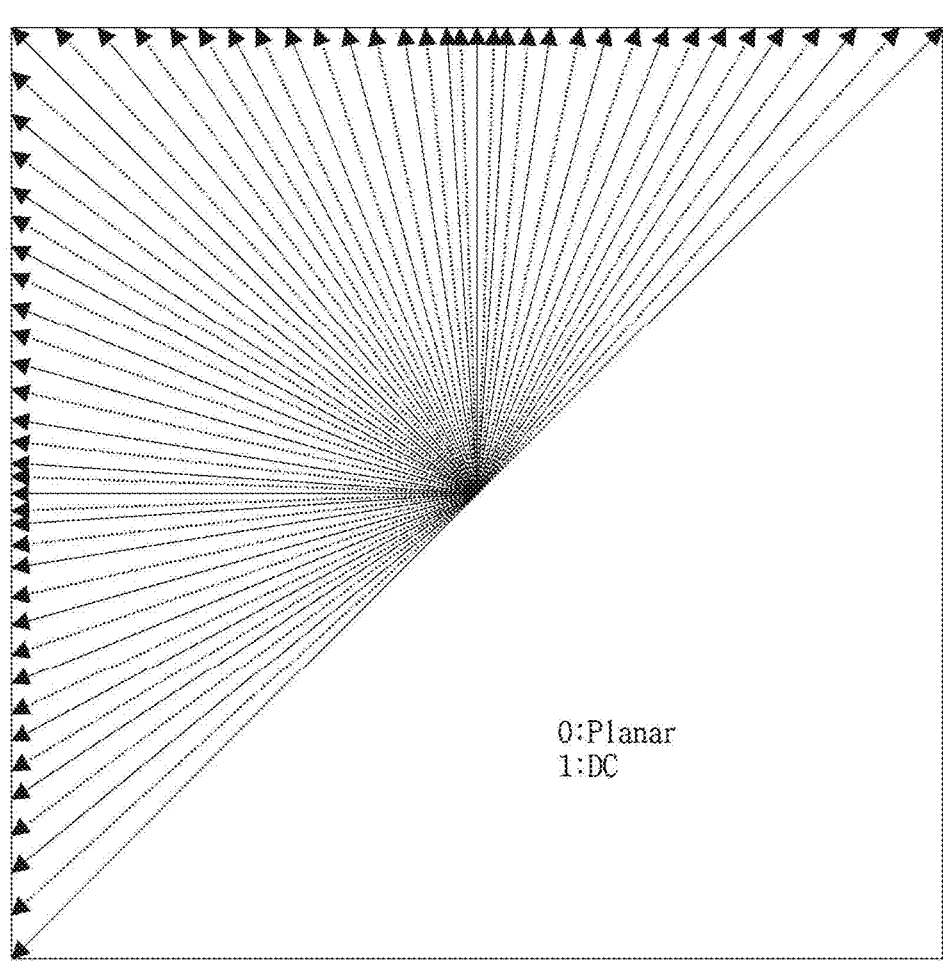
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
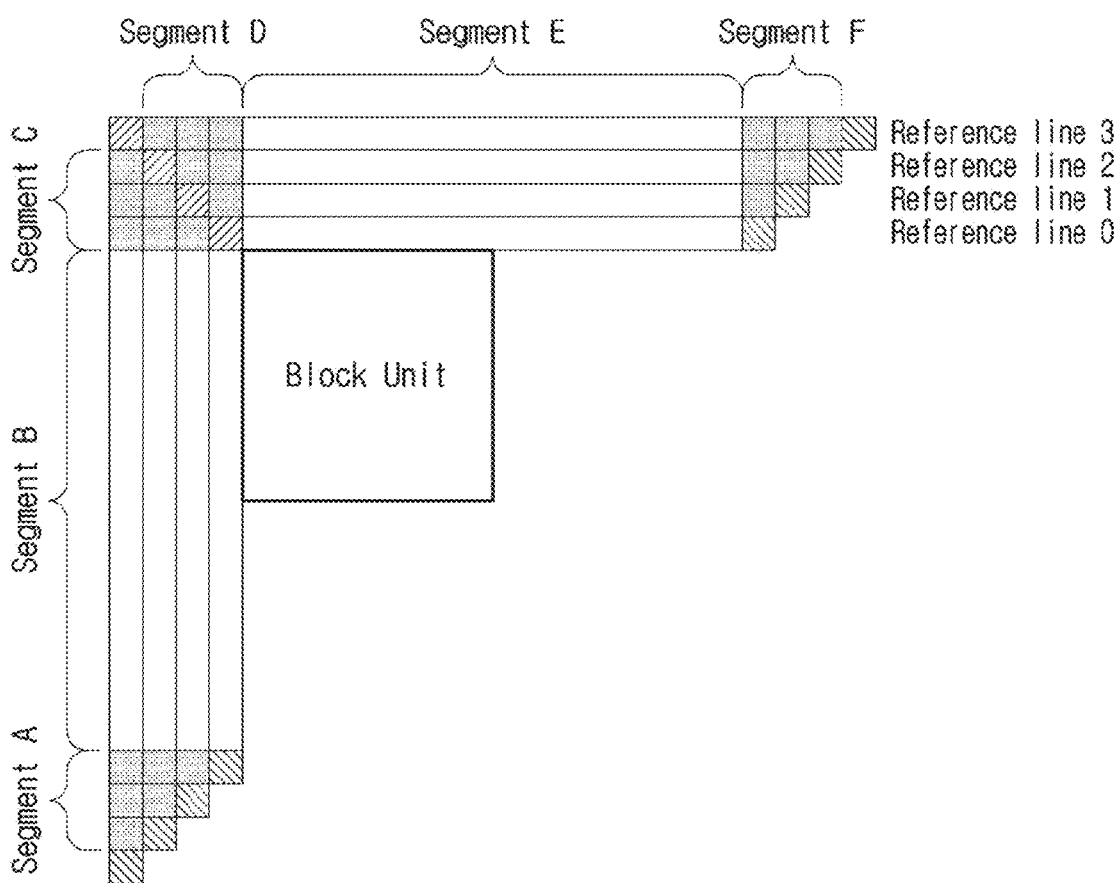
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
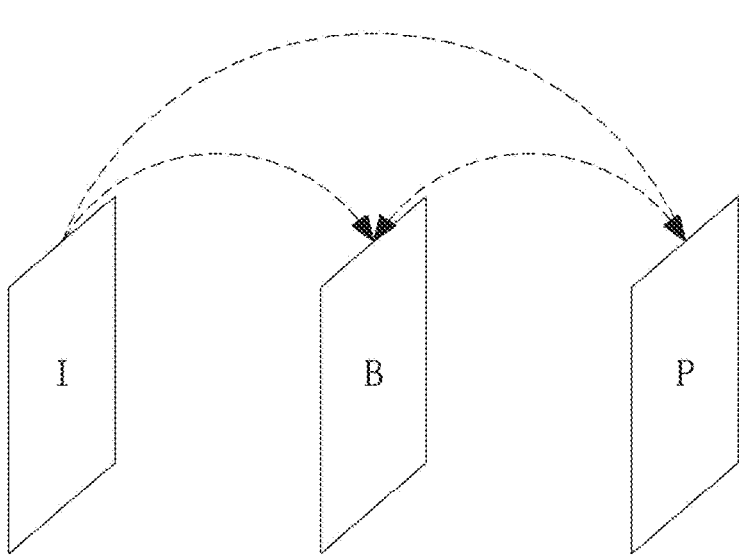
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
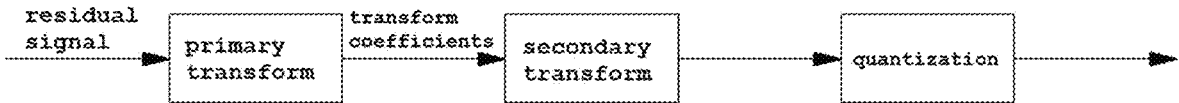
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block shape change into a one-dimensional vector shape. Aside from the diagonal up-right scan, the horizontal scan of horizontally scanning a two-dimensional block shape of coefficients or the vertical scan of vertically scanning a two-dimensional block shape of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block shape through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled in a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled in the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, referring to FIGS. 8 to 23, will be described a sub-block partitioning method and/or a method of deriving prediction information between sub-blocks according to an embodiment of the present invention.

A method of deriving inter-prediction information will be described.

When performing inter-prediction of a current block according to a merge mode, a merge candidate may include a spatial merge candidate, a temporal merge candidate, a sub-block based temporal merge candidate, a sub-block based temporal spatial combined merge candidate, a combined merge candidate, a zero merge candidate, etc. A merge candidate may include inter-prediction information of at least one of an inter-prediction indicator, a reference picture index of a reference picture list, a motion vector, and a picture order count (POC).

A method of deriving a spatial merge candidate will be described.

From a reconstructed block spatially adjacent to a current block to be encoded/decoded, a spatial merge candidate of the current block may be derived.

Figure 8:
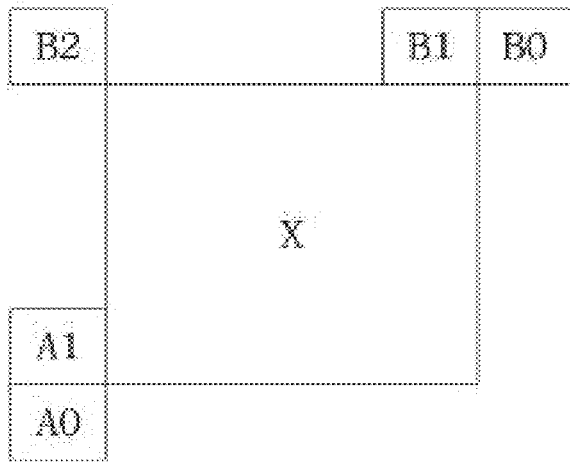
FIG. 8 is a view showing a method of deriving a spatial merge candidate according to an embodiment of the present invention.

FIG. 8 is a view showing a method of deriving a spatial merge candidate according to an embodiment of the present invention.

Referring to FIG. 8, motion information may be derived from a block corresponding to at least one of a block A1 positioned at the left of a current block X to be encoded/decoded, a block B1 positioned at the upper of the current block X, a block B0 positioned at the right upper corner of the current block X, a block A0 positioned at the left lower corner of the current block X, and a block B2 positioned at the left upper corner of the current block X. In addition, a spatial merge candidate of the current block may be determined by using the derived motion information. In an example, the derived motion information may be used as a spatial merge candidate of the current block.

A spatial merge candidate may mean a block reconstructed spatially adjacent to a block to be encoded/decoded (or, motion information of a reconstructed block that is spatially adjacent). The block may have a square shape or a non-square shape. In addition, a block reconstructed spatially adjacent to a block to be encoded/decode may be divided by a unit of a lower level block (sub-block). At least one spatial merge candidate may be derived for each lower level block. Deriving a spatial merge candidate may mean deriving a spatial merge candidate and adding the same to a merge candidate list. Herein, each of merge candidates added to a merge candidate list may have different motion information.

A spatial merge candidate may be derived up to maxNumSpatialMergeCand. Herein, maxNumSpatialMergeCand may be a positive integer including 0. In an example, maxNumSpatialMVPCand may be 5. MaxNumMergeCand may be a maximum number of merge candidates that may be included in a merge candidate list, and may be a positive integer including 0. In addition, numMergeCand may mean a number of merge candidates included in a practical merge candidate list within a predefined MaxNumMergeCand. Meanwhile, use of maxNumSpatialMergeCand, numMergeCand, MaxNumMergeCand does not limit the scope of the present invention. Encoding/decoding apparatuses may use the above information by using a parameter value having the same meaning with numMergeCand, and MaxNumMergeCand.

A method of deriving a temporal merge candidate will be described.

A temporal merge candidate may be derived from a block that is reconstructed in a temporally adjacent or reference picture of a current block to be encoded/decoded. The reference picture temporally adjacent to the current block may mean a co-located picture (picture). Information of the co-located picture (for example, at least one of an inter-prediction indicator, a reference picture index, and motion vector information indicating a co-located block for the current block) may be transmitted from an encoder to a decoder in at least one coding block unit within sequence/picture/slice/tile/CTU/CU. Meanwhile, information on a co-located picture may be signaled in a plurality of units. For example, information on a co-located picture may be signaled in a picture unit and a slice unit, respectively. Alternatively, information on the co-located picture may be implicitly derived in an encoder/decoder by using at least one of a hierarchy according to an encoding/decoding order in an encoder/decoder, motion information of a current block or temporally spatially adjacent blocks that are already encoded/decoded or both (for example, an inter-prediction indicator or a reference picture index or both), an inter-prediction indicator for a co-located picture in a sequence/picture/slice/tile level, and reference picture index information. For example, when there is no information on a co-located picture at a slice level, information on a co-located picture at a picture level may be considered as information on a co-located picture at the slice level.

Herein, when deriving a temporal merge candidate for a current block, a co-located picture and/or a position of a co-located block within the co-located picture may be selected by using at least one piece of motion information of a temporally and spatially adjacent block that is already encoded/decoded. Thus, a block at an identical position within the co-located picture may be selected on the basis of a position of the current block. Alternatively, a co-located block of the current block may be defined as a block that is moved by a corresponding vector from a spatially identical position for the current block within a selected co-located picture by using at least one piece of motion vector information of a temporally and spatially adjacent block that is already encoded/decoded.

Herein, the motion information of the temporally and spatially adjacent block that is already encoded/decoded may be at least one of a motion vector, a reference picture index, an inter-prediction indicator, a picture order count (POC), and information on a co-located picture at a current coding picture (or slice) level.

Deriving a temporal merge candidate may mean adding a derived temporal merge candidate to a merge candidate list when the motion information of the derived temporal merge candidate differs with that of the merge candidate list.

The number of temporal merge candidates thus derived may be as many as maxNumTemporalMergeCand. Here, maxNumTemporalMergeCand may be a positive integer including 0. For example, maxNumTemporalMergeCand may be 1. However, the use of the maxNumTemporalMergeCand does not limit the scope of the present invention. An encoder/decoder may use the above information through a parameter value having the same meaning as maxNumTemporalMergeCand.

Meanwhile, prediction using a temporal merge candidate may be referred as TMVP (temporal motion vector prediction).

Figures 9, 10:
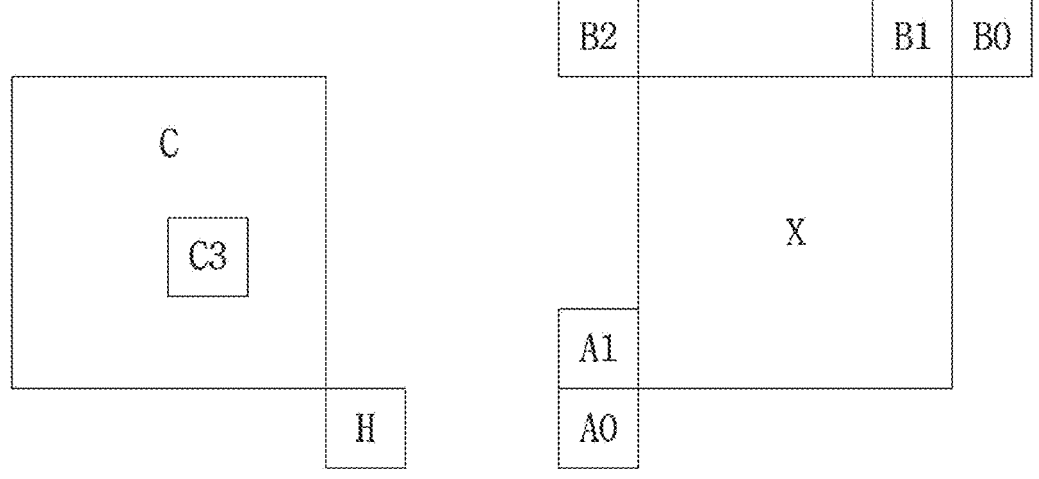
FIG. 9 is a view showing a method of deriving a temporal merge candidate according to an embodiment of the present invention.
FIG. 10 is a view showing a method of deriving a sub-block based temporal-spatial combined merge candidate according to an embodiment of the present invention.

FIG. 9 is a view showing a method of deriving a temporal merge candidate according to an embodiment of the present invention.

Referring to FIG. 9, a temporal merge candidate may be derived in a block at a position H that is present at the outside of a co-located block C positioned spatially identical to a current block X to be encoded/decoded within a reference picture of a current picture to be encoded/decoded, or a block at a position C3.

Herein, when a temporal merge candidate is possibly derived from a block at a position H, the temporal merge candidate may be derived from the block at a position H. Otherwise, when the temporal merge candidate is not derived from the block at a position H, the temporal merge candidate may be derived from the block at a position C3. An order of deriving the temporal merge candidate may vary.

Meanwhile, when a predetermined position or position C3 is intra-encoded, a temporal merge candidate may be derived in a block at the position H or position C3. A co-located block of a current block may have a square shape or a non-square shape.

When a distance between a picture to which a current block is included and a reference picture of the current block differs from a distance between a picture to which a co-located block is included and a reference picture of the co-located block, a temporal merge candidate may be derived by performing scaling for a motion vector of the co-located block. Scaling of a motion vector may be performed according to a ratio of td to tb (in an example, Ratio=(tb/td)). Herein, td may mean a difference value between a POC of a co-located picture and a POC of a reference picture of a co-located block. In addition, tb may mean a difference value between a POC of a picture to be encoded/decoded and a POC of a reference picture of a current block.

Deriving a sub-block based temporal merge candidate will be described.

A temporal merge candidate may be derived from a co-located sub-block to be encoded/decoded in a sub-block unit having at least one of a size, a shape, and a depth smaller than a current block. For example, the sub-block may be a block having a horizontal or vertical length smaller than a current block, or a block having deeper depth or minimized shape than the current block, or may be a block included in the current block.

A co-located sub-block of a sub-block to be encoded/decoded may have a square shape or a non-square shape. In addition, a co-located block of a current block may be divided by a sub-block unit having at least one of a size, a shape, and a depth smaller or deeper than the current block. At least one temporal merge candidate may be derived for each sub-block.

When deriving at least one temporal merge candidate by performing division in a sub-block unit, a temporal merge candidate may be derived in a co-located sub-block at a position H or C3 or both described with FIG. 9 according to at least one of a size, a shape, and a depth of the sub-block. Alternatively, by using motion information (in an example, at least one of a motion vector, reference picture index, an inter-prediction indicator, and a POC) stored in each sub-block unit of a co-located block in association with a position moved by arbitrary motion information derived from neighbor blocks of a current block, at least one temporal merge candidate may be derived.

Meanwhile, whether or not to derive a subblock-based temporal merge candidate may be determined on the basis of whether or not there is motion information on a sub-block at a predefined position of a co-located block corresponding to a position that is moved according to random motion information derived from neighboring blocks of a current block. For example, only when there is motion information in a sub-block at a predefined position of a co-located block, a subblock-based temporal merge candidate may be derived. Herein, a sub-block at a predefined position of a co-located block may be a sub-block at a central position.

Meanwhile, when there is no available motion information stored at each sub-block unit of a co-located block corresponding to a position that is moved according to random motion information derived from neighboring blocks of a current block, at least one temporal merge candidate may be derived by using motion information of a sub-block at a predefined position of a co-located block that is used to determine whether or not to derive a subblock-based temporal merge candidate.

When deriving a temporal merge candidate for a current block or a sub-block of the current block, a motion vector of each reference picture list (for example, L0 or L1 or both) brought from a co-located sub-block within a co-located block may be scaled as a motion vector corresponding to an arbitrary reference picture of the current block. Alternatively, after a plurality of motion vectors is obtained by scaling a motion vector brought from a co-located sub-block as a motion vector corresponding to at least one reference picture among all reference pictures capable of being referenced in a sub-block of a current block, at least one prediction block using a scaled motion vector corresponding to each reference picture may be obtained. In addition, a prediction block of a current block or a sub-block may be obtained by using a weighted sum of the obtained prediction blocks.

Meanwhile, prediction through a subblock-based temporal merge candidate may be referred to as subblock-based temporal motion vector prediction (SbTMVP).

A method of deriving a sub-block based temporal spatial combined merge candidate will be described.

A merge candidate of a current block may be derived by dividing the current block into sub-blocks and by using at least one piece of motion information of a spatially adjacent sub-block and a co-located sub-block within a co-located picture for each sub-block unit which is obtained.

FIG. 10 is a view showing a method of deriving a sub-block based temporal spatial combined merge candidate according to an embodiment of the present invention.

FIG. 10 is a view showing a block structure where a shadow represented by 8×8 current blocks is divided into four 4×4 sub-blocks (that is, A, B, C, and D blocks). A sub-block based temporal spatial combined merge candidate may be derived by using motion vector information of sub-blocks that are temporally spatially adjacent to each sub-block. Herein, motion vector information may mean a motion vector, an inter-prediction indicator, a reference picture index, a POC, etc.

In FIG. 10, when deriving a residual signal according to motion compensation after dividing a current block into sub-blocks, motion information may be obtained by performing scanning that starts at a sub-block a that is the upper part of a first sub-block A from the left to the right direction. In an example, when a first upper sub-block is encoded by using an intra-prediction method, a second upper sub-block may be sequentially scanned. In other words, scanning for upper sub-blocks may be performed until an upper sub-block including usable motion vector information is found.

In addition, after obtaining usable motion information for an upper sub-block, usable motion information may be obtained by performing scanning at a sub-block c that is the left of a first sub-block A from the upper to the lower direction.

In addition, after obtaining spatially adjacent motion information of a left or upper sub-block or both, temporal motion information may be derived by obtaining motion information of a co-located sub-block of a current sub-block or a co-located block or both.

Herein, a position of a co-located block or a sub-block of the co-located block may be motion information at a position C3 or position H described with FIG. 9, or may mean a co-located block at a position compensated by a motion vector derived adjacent to a current block or a sub-block of the co-located block. At least one of motion information of a block spatially adjacent to L0 or L1 or both and motion information of a temporally adjacent block may be obtained by using the above method. In addition, based on the at least one piece of obtained motion information, a sub-block based temporal spatial combined merge candidate of a current sub-block to be encoded/decoded may be derived.

In an example, for L0 or L1 or both, at least one piece of motion vector information derived in the described temporal/spatial sub-block for a sub-block of a current block, scanning of a motion vector may be performed so as to be associated with a first reference picture of the current block. Subsequently, by using at least one of an average value, a maximum value, a minimum value, a median value, a weighted value, and a mode of up to three scaled motion vectors, a motion vector of a first current sub-block A or a temporal spatial combined merge candidate of the first sub-block A may be derived. In addition, a temporal spatial combined merge candidate of sub-blocks B, C, and D may be derived by using the above method.

Meanwhile, prediction using a sub-block based temporal spatial combined merge candidate may be referred as STMVP (spatial-temporal motion vector prediction).

Deriving an additional merge candidate will be described.

As an additional merge candidate that may be used in the present invention, at least one of a modified spatial merge candidate, a modified temporal merge candidate, a combined merge candidate, and a merge candidate having a predetermined motion information value may be derived.

Herein, deriving an additional merge candidate may mean, when a merge candidate having motion information different to a merge candidate present in an existing merge candidate list is present, adding the corresponding merge candidate to the merge candidate list.

The modified spatial merge candidate may mean a merge candidate in which motion information of at least one of spatial merge candidate derived by using the above method is modified.

The modified temporal merge candidate may mean a merge candidate in which motion information of at least one temporal merge candidate derived by using the above method is modified.

The combined merge candidate may mean a merge candidate using at least one piece of motion information of merge candidates that are a spatial merge candidate, a temporal merge candidate, a modified spatial merge candidate, a modified temporal merge candidate, a combined merge candidate, and a merge candidate having a predetermined motion information value which are present in a merge candidate list. Herein, a combined merge candidate may mean a combined bi-prediction merge candidate. Meanwhile, prediction using a combined merge candidate may be referred as CMP (combined motion prediction).

The merge candidate having a predetermined motion information value may mean a zero merge candidate having a motion vector of (0, 0). Meanwhile, prediction using a merge candidate having a predetermined motion information value may be referred as ZMP (zero motion prediction).

At least one of the modified spatial merge candidate, the spatial merge candidate, the modified temporal merge candidate, the temporal merge candidate, the combined merge candidate, the merge candidate having a predetermined motion information value may be derived for each sub-block of a current block, and the merge candidate derived for each sub-block may be added to the merge candidate list.

Inter-prediction information may be derived in a sub-block unit having at least one of a size, a shape, and a depth smaller or deeper than a current block to be encoded/decoded. In an example, the size may mean a horizontal or vertical size or both.

When deriving inter-prediction information in a sub-block unit of a current block, the encoder/decoder may derive inter-prediction information by using at least one of a bi-directional matching method, and a template matching method.

When using a bi-directional matching method, an initial motion vector list may be configured. When configuring an initial motion vector list, a motion vector adjacent to a current block may be used.

In an example, an initial motion vector list may be configured by using a prediction motion vector candidate of an AMVP mode of a current block.

In another example, an initial motion vector list may be configured by using a merge candidate of a merge mode of a current block.

In another example, an initial motion vector list may be configured with a uni-directional motion vector of L0 or L1 of a merge mode or both of a current block.

In another example, an initial motion vector list may be configured with a motion vector of remaining blocks other than a merge mode of a current block.

In another example, an initial motion vector list may be configured by combining at least N motion vectors of the above examples. Herein, N may represent a positive integer greater than 0.

In another example, an initial motion vector list may be configured with a motion vector of one direction of List0 or List1.

Figure 11:
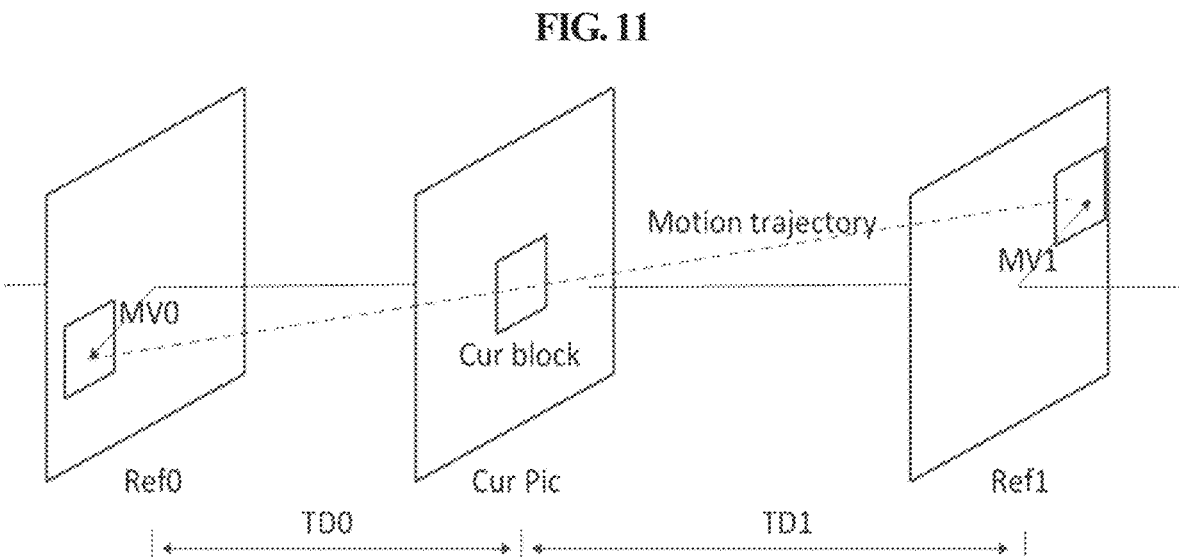
FIG. 11 is a view showing a method of deriving inter-prediction information by using a bi-directional matching method according to an embodiment of the present invention.

FIG. 11 is a view showing a method of deriving inter-prediction information by using a bi-directional matching method according to an embodiment of the present invention.

Referring to FIG. 11, when a motion vector present in an initial motion vector list is an MV0 present in a L0 list, in a reference picture in the opposite direction, an MV1 may be derived that is present on the same trajectory with the MV0 and that indicates a block that matches best with a block indicated by the MV0. Herein, an MV having the smallest SAD (sum of absolute differences) between blocks indicated by the MV0 and the MV1 may be derived as inter-prediction information of a current sub-block.

Figure 12:
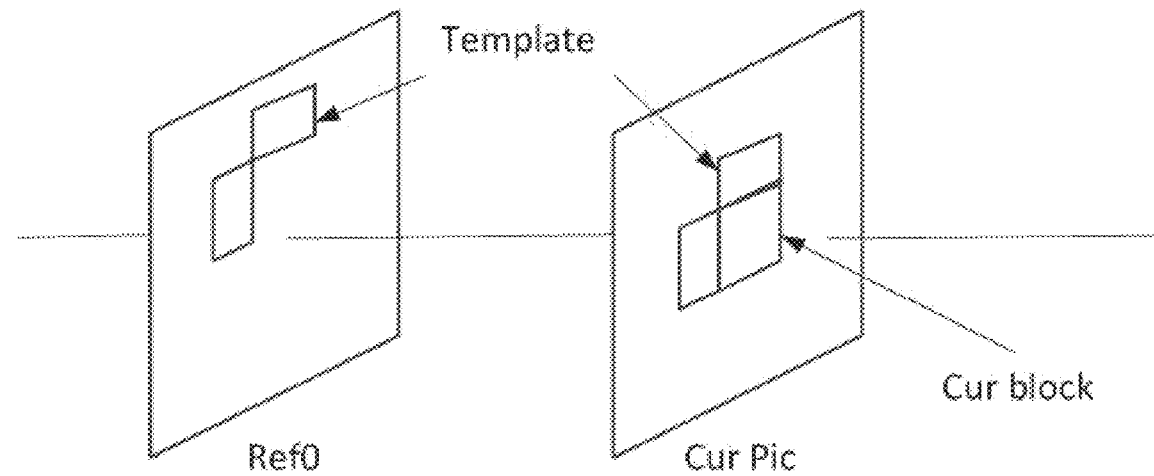
FIG. 12 is a view showing a method of deriving inter-prediction information by using a template matching method according to an embodiment of the present invention.

FIG. 12 is a view showing a method of deriving inter-prediction information by using a template matching method according to an embodiment of the present invention.

By using a template defined in FIG. 12, a neighbor block of a current block may be used as a template. Herein, horizontal (width) and vertical (height) sizes of a template may be the same with or differ from horizontal (width) and vertical (height) sizes of a current block.

In an example, an upper part of a current block (Cur block) may be used as a template.

In another example, a left part of a current block may be used as a template.

In another example, a left part and an upper part of a current block may be used as a template.

In another example, in a reference picture (Ref0) of a current picture (Cur Pic), an upper part or a left part or both of a co-located block of a current block may be used as a template.

In another example, an MV having the smallest SAD between a template of a current block and a template of a reference block may be derived as inter-prediction information of a current sub-block.

When deriving inter-prediction information in a sub-block unit of a current block, brightness compensation may be performed. For example, change in brightness of a spatial neighbor sample of a current block which is sampled in at least N samples, N being an arbitrary positive integer, and of a spatial neighbor sample of a reference block may be approximated by using linear model. In addition, the linear model may be applied to a block for which motion compensation of a current sub-block is applied so as to perform brightness compensation.

When deriving inter-prediction information in a sub-block unit of a current block, affine based spatial motion prediction and compensation may be performed. For example, for a motion vector of left upper coordinates of a current block and a motion vector at a right upper of the current block, a motion vector may be generated by using an affine transform formula in a sub-block unit of the current block. In addition, motion compensation may be performed by using the generated motion vector.

FIG. 13 is a view showing a method of deriving inter-prediction information on the basis of OMBC (overlapped block motion compensation) according to an embodiment of the present invention.

When deriving inter-prediction information in sub-block unit of a current block, combining a block compensated by using inter-prediction information of a current block with at least one sub-block compensated by using inter-prediction information of at least one of sub-blocks at left, right, upper, and lower positions which are included in the current block, a prediction block of the sub-block of the current block based on OBMC may be generated.

In an example, performing may be applied for only a sub-block present at a boundary position of inside of a current block.

In another example, performing may be applied for all sub-blocks inside of a current block.

In another example, performing may be applied for a sub-block present at a left boundary position of inside of a current block.

In another example, performing may be applied for a sub-block present at a right boundary position of inside of a current block.

According to an embodiment of the present invention, a picture may be encoded/decoded by dividing the same by a number of sub-block units. A unit and a block may be used having the same meaning.

Figure 14:
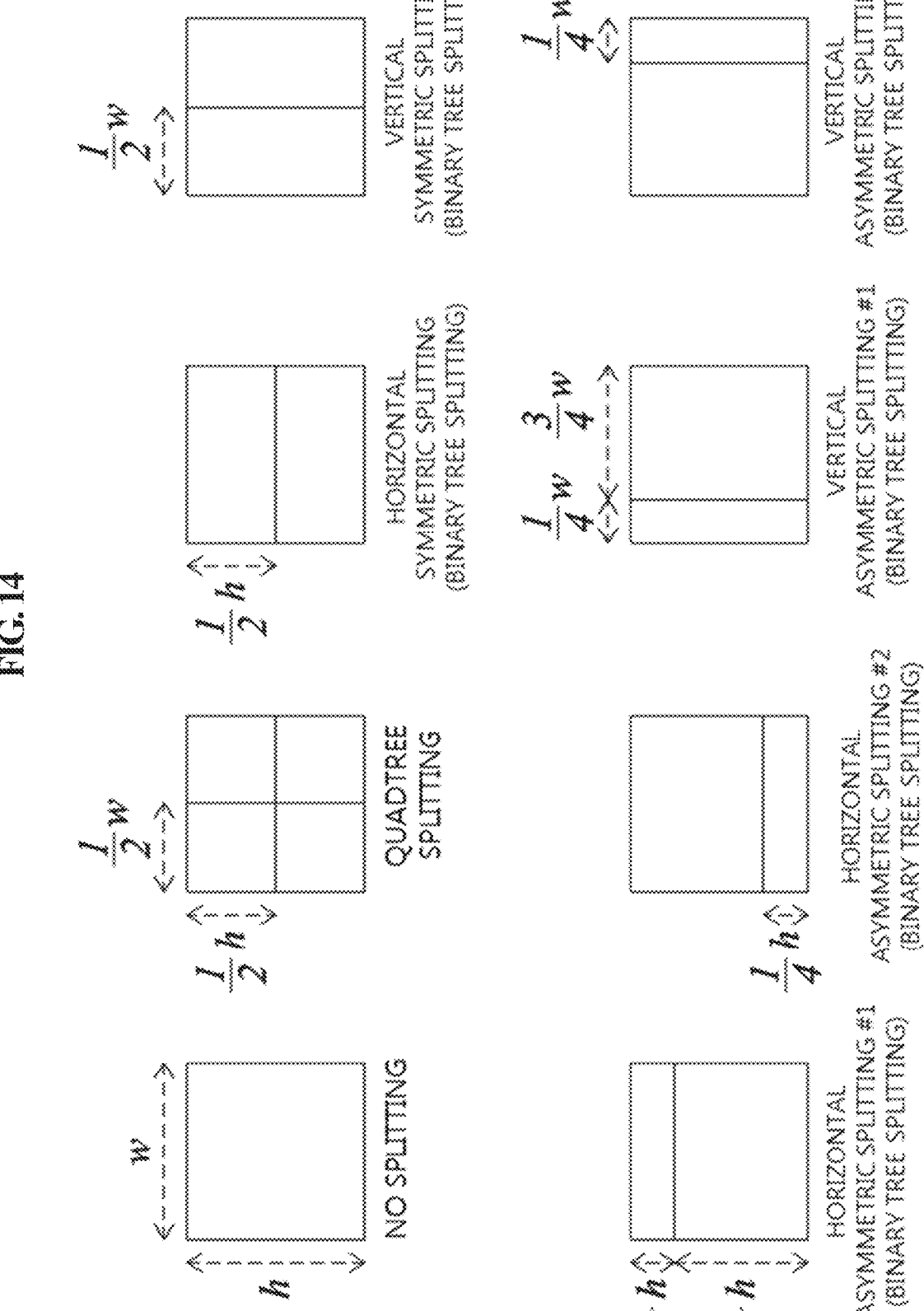
FIG. 14 is a view showing quad-tree partitioning, symmetric binary-tree partitioning, and asymmetric binary-tree partitioning according to an embodiment of the present invention.

FIG. 14 is a view showing quad-tree division, symmetric binary-tree division, and asymmetric binary division according to an embodiment of the present invention. In FIG. 14, w may represent a horizontal size of a block, and h may represent a vertical size of the block.

Referring to FIG. 14, quad-tree division is a division shape where one block is divided into four sub-blocks, horizontal and vertical sizes of the four sub-blocks may be a half of horizontal and vertical sizes of a block before being divided.

Binary-tree division is a division shape where one block is divided into two sub-blocks, and symmetric binary-tree division (symmetric splitting) or asymmetric binary-tree division (asymmetric splitting) may be included. Herein, symmetric binary-tree division may include horizontal directional symmetric division and vertical directional symmetric division. In addition, asymmetric binary-tree division may include horizontal directional asymmetric division or vertical directional asymmetric division or both. Meanwhile, a leaf node of a binary-tree may mean a CU.

Nodes divided by a symmetric binary-tree may have identical sizes. Meanwhile, nodes divided by an asymmetric binary-tree may have different sizes.

According to an embodiment of the present invention, as a division structure, quad-tree (QT) division may be present.

Referring to FIG. 14, one CTU may be recursively divided into a plurality of CUs by using a quad-tree structure. Whether to use intra-prediction or inter-prediction may be determined on the basis of a CU unit.

In an example, one CU may be divided into at least M PUs. Herein, M may be a positive integer equal to or greater than 2.

In another example, one CU may be divided into at least N TUs by using a quad-tree structure. Herein, N may be a positive integer equal to or greater than 2.

According to an embodiment of the present invention, as a division structure, a binary-tree after quad-tree division may be present. Binary-tree after quad-tree division may mean a division structure where quad-tree division is preferentially applied and then binary-tree division is applied. Herein, a leaf node of a quad-tree or a leaf node of a binary-tree may mean a CU.

In an example, one CTU may be recursively divided into two or four CUs by using binary-tree after quad-tree division. Herein, when a CU is divided into two, division may be performed by using a binary-tree (BT) structure, and when a CU is divided into four, division may be performed by using a quad-tree structure. A CU may have a square shape or a non-square (rectangle) shape since a CTU is divided by a quad-tree and then a binary-tree.

When a CU is divided by using binary-tree after quad-tree division, at least one of a first flag (information indicating whether or not quad-tree division is performed or whether or not further division is performed or both) and a first index (information indicating of whether horizontal symmetric division or vertical symmetric is performed, and whether or not further division is performed or both) may be signaled. Herein, when the first flag indicates a first value, it may indicate that division is performed by using a quad-tree structure, and when the first flag indicates a second value, it may indicate that further division is not performed. In addition, when the first index indicates a first value, it may indicate that further division is not performed, when the first index indicates a second value, it may indicate horizontal directional symmetric division, and when the first index indicates a third value, it may indicate vertical directional symmetric division. A first index may be signaled when a first flag indicates a second value. In addition, when a CU is determined that further division for the same is not possible on the basis of a size or depth of the CU or both, a first flag or a first index or both may not be signaled.

Figure 15:
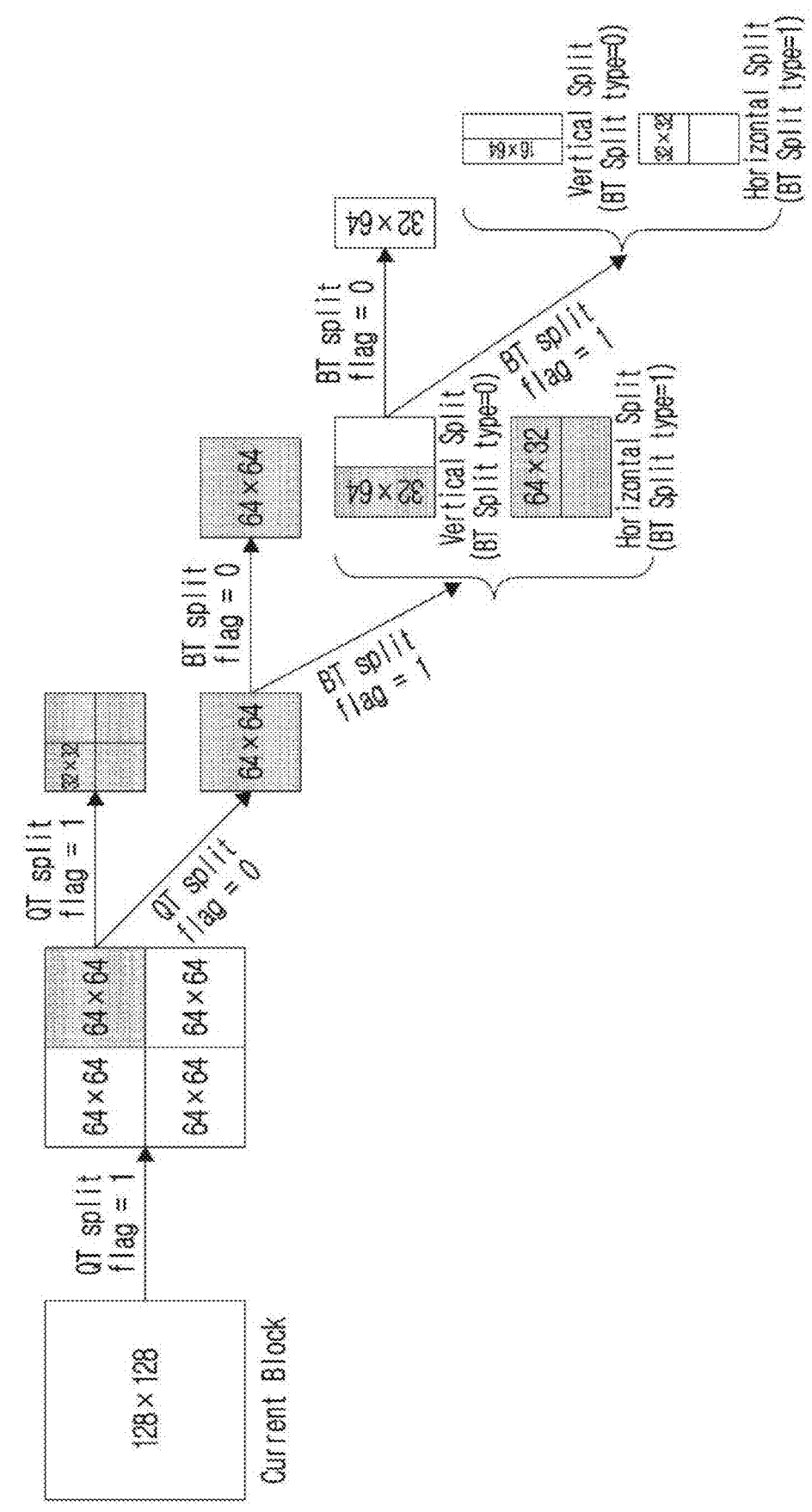
FIG. 15 is a view showing symmetric binary-tree partitioning after quad-tree partitioning according to an embodiment of the present invention.

FIG. 15 is a view showing symmetric binary-tree division after quad-tree division according to an embodiment of the present invention. In FIG. 15, QT split flag may indicate whether or not quad-tree division is performed, BT split flag may indicate whether or not binary-tree division is performed, and BT split type may indicate whether horizontal division (or horizontal directional division) or vertical division (or vertical directional division) is performed.

Referring to FIG. 15, one CTU may be divided by using a quad-tree structure. In addition, a leaf node of a quad-tree may be additionally divided by using a binary-tree structure. Herein, a leaf node of a quad-tree or a leaf node of a binary-tree may mean a CU.

In a binary-tree after quad-tree division structure, a CU may be used as a unit for performing prediction and transform without additionally dividing the same. In other words, in a binary-tree after quad-tree division structure, a CU, a PU, and a TU may have the same size. In addition, whether to use intra-prediction or inter-prediction may be determined in a CU unit. In other words, in a binary-tree after quad-tree division structure, at least one of intra-prediction, inter-prediction, transform, inverse-transform, quantization, dequantization, entropy encoding/decoding, and in-loop filtering may be performed in a square block or non-square (rectangle) block unit.

A CU may include one luma (Y) component block and two chroma (Cb/Cr) component blocks. In addition, a CU may include one luma component block, or two chroma component blocks. In addition, a CU may include one luma component, a Cr chroma component block, or a Cb chroma component block.

According to an embodiment of the present invention, a quad-tree after binary-tree division may be present as a division structure.

According to an embodiment of the present invention, combined quad-tree and binary-tree division may be present as a division structure. Combined quad-tree and binary-tree division may mean a division structure where quad-tree division and binary-tree division are applied without priority. In binary-tree after quad-tree division described above, quad-tree division is preferentially applied. However, in combined quad-tree and binary-tree division, quad-tree division is not precedent and binary-tree division may be applied first.

One CTU may be recursively divided into two or four CUs by using a combined quad-tree and binary-tree division structure. In a combined quad-tree and binary-tree division structure, quad-tree division or binary-tree division may be applied for one CU. Herein, when a CU is divided into two, division may be performed by using a binary-tree, and when a CU is divided into four, division may be performed by using a quad-tree. In addition, since a CU is obtained by dividing a CTU by using a combined quad-tree and binary-tree structure, the CU may have a square or non-square (rectangle) shape.

By using a block division structure of a combined quad-tree and binary-tree shape, a picture may be encoded/decoded in all non-square block shapes having predetermined horizontal and vertical sizes or greater.

A luma signal and a chroma signal within a CTU may be divided by block division structures different from each other. For example, in case of a specific slice (I slice), a luma signal and a chroma signal within a CTU may be divided by block division structures different from each other. In case of other slice (P or B slice), a luma signal and a chroma signal within a CTU may be divided by an identical block division structure. Herein, a Cb signal and a Cr signal may use a different intra-prediction mode, and an intra-prediction mode of each of the Cb signal and the Cr signal may be entropy encoded/decoded. An intra-prediction mode of a Cb signal may be entropy encoded/decoded by using an intra-prediction mode of a Cr signal. Conversely, an intra-prediction mode of a Cr signal may be entropy encoded/decoded by using an intra-prediction mode of a Cb signal.

A method of deriving intra-prediction or inter-prediction information or both based on a sub-block will be described. Hereinafter, a sub-block division method will be described.

A current block (CU) may have a square or rectangle shape or both, and may mean a leaf node of at least one of a quad-tree, a binary-tree, and a three-division tree. In addition, at least one of intra-prediction or inter-prediction or both, primary/secondary transform and inverse-transform, quantization, dequantization, entropy encoding/decoding, and in-loop filtering encoding/decoding may be performed in a unit of at least one of a size, a shape, and a depth of a current block (CU).

A current block may be divided into at least one of a symmetric or asymmetric sub-block or both. Intra-prediction or inter-prediction information or both may be derived for each sub-block. Herein, a symmetric sub-block may mean a sub-block obtained by using at least one of quad-tree, binary-tree, and three-division tree division structures described with FIG. 14. Meanwhile, an asymmetric sub-block may mean a sub-block obtained by using a division structure that will be described with FIG. 16, but it is not limited thereto. An asymmetric sub-block may mean at least one sub-block having a shape other than a square or rectangle shape or both among sub-blocks.

In FIG. 16, when a current block is divided into two sub-blocks, the two sub-blocks may be defined as a first sub-block, and a second sub-block, respectively. Meanwhile, the first sub-block may be called a sub-block A, and the second sub-block may be called a sub-block B.

When a current block is divided into at least one of a symmetric or asymmetric sub-block or both, a minimum size of the sub-block may be defined as M×N. Herein, M and N may respectively mean a positive integer greater than 0. In addition, M and N may have the same or different values from each other. In an example, a 4×4 block may be defined as a minimum-size sub-block.

When a current block is divided into at least one of a symmetric or asymmetric sub-block or both, block division may not be further performed for a specific block size or specific block depth or smaller/deeper. Information of the specific block size or specific block depth may be entropy encoded/decoded in a unit of at least one of a vide parameter set (VPS), a sequence parameter set (SPS), a picture parameter set (PPS), a tile header, a slice header), a CTU, and a CU.

Information of the specific block size or specific block depth may be entropy encoded/decoded for each of luma and chroma signals, and may have parameter values different from each other.

Information of the specific block size or specific block depth may be entropy encoded/decoded for each of Cb and Cr signals, and may have different parameter values.

Information of the specific block size of specific block depth may be entropy encoded/decoded for each upper level, and may have different parameter values.

Information of the specific block size or specific block depth may be determined on the basis of comparison between a size of a current block or a depth of the current bloc and a predetermined threshold value. A predetermined threshold value may mean a reference size or depth determining a block structure. In addition, a predetermined threshold value may be represented in a shape of at least one of a minimum value and a maximum value of the reference size or depth. In addition, a predetermined threshold value may be a value predefined in the encoder/decoder, may be variably derived on a basis of a coding parameter of a current block, or may be signaled through a bitstream.

In an example, when a size or depth of a current block is equal to or smaller/equal to or greater than a predetermined threshold, dividing the current block into at least one sub-block may not be performed. For example, when the sum of horizontal and vertical lengths of a current block is equal to or smaller than a predetermined threshold value, dividing the current block into at least one sub-block may not be performed.

For another example, when a size or depth of a current block is less and/or greater than a predetermined threshold, partitioning the current block into at least one sub-block may not be performed. For example, when the sum of horizontal and vertical lengths of a current block is less than a predetermined threshold, the current block may not be partitioned into at least one sub-block. In addition, when the horizontal and vertical lengths of a current block are less than a predetermined threshold respectively, the current block may not be partitioned into at least one sub-block. Here, the predetermined threshold may be 8.

For another example, when a current block is a quad-tree leaf node having a predetermined threshold depth, partitioning the current block into at least one sub-block may not be performed.

For another example, when a current block is a binary-tree leaf node having a predetermined threshold depth, partitioning the current block into at least one sub-block may not be performed.

For another example, when a current block is a quad-tree, binary-tree and/or ternary leaf node performing motion prediction/compensation through an affine transform formula, partitioning the current block into at least one sub-block or asymmetric sub-block may not be performed.

For another example, when a current block is a quad-tree, binary-tree and/or ternary leaf node that derives inter-prediction information by using at least one of a bi-directional matching method and a template matching method, partitioning the current block into at least one sub-block or asymmetric sub-block may not be performed.

When a current block is partitioned into at least one asymmetric sub-block, at least one of sub-blocks thus obtained may have an arbitrary shape other than square and/or rectangle.

For example, a current block may be partitioned into two sub-blocks by a straight line. In this case, the sub-blocks thus obtained may be triangular, square (rectangular, trapezoidal), and hexagonal block shapes.

According to the present invention, when a current block is partitioned into at least one asymmetric sub-block, at least one of the sub-blocks thus obtained may have a triangular shape.

FIG. 16 is a view showing asymmetric partitioning according to an embodiment of the present invention. In FIG. 16, w may represent a horizontal size of a block, and h may represent a vertical size of the block.

In FIG. 16A, when a current block is partitioned into two sub-blocks, the current block may be partitioned into two triangular sub-blocks with a diagonal boundary running from top left to bottom right of the current block. Here, the remaining region other than the upper right region (a second sub-block or sub-block B) of the current block may be defined as a first sub-block or sub-block A.

In FIG. 16B, when a current block is partitioned into two sub-blocks, the current block may be partitioned into two triangular sub-blocks with a diagonal boundary running from top right to bottom left of the current block. Here, the remaining region other than the lower right region (a second sub-block or sub-block B) of the current block may be defined as a first sub-block or sub-block A.

Referring to FIGS. 16A and 16B, when a current block is partitioned into four sub-blocks, the current block may be partitioned into four triangular sub-blocks that are obtained by drawing a diagonal boundary from top left to bottom right and then a diagonal boundary from top right to bottom left. Alternatively, a current block may be partitioned into four triangular sub-blocks by drawing a diagonal boundary from top right to bottom left and then a diagonal boundary from top left to bottom right.

Meanwhile, the partitioning for triangular sub-blocks may be applied when a motion prediction/compensation method of a current block (CU) is at least one of a skip mode and a merge mode.

In FIG. 16C, when a current block is partitioned into two sub-blocks, the remaining region other than the lower right region (a second sub-block or sub-block B) of the current block may be defined as a first sub-block or sub-block A.

In FIG. 16D, when a current block is partitioned into two sub-blocks, the remaining region other than the lower left region (a second sub-block or sub-block B) of the current block may be defined as a first sub-block or sub-block A.

In FIG. 16E, when a current block is partitioned into two sub-blocks, the remaining region other than the upper right region (a second sub-block or sub-block B) of the current block may be defined as a first sub-block or sub-block A.

In FIG. 16F, when a current block is partitioned into two sub-blocks, the remaining region other than the upper left region (a second sub-block or sub-block B) of the current block may be defined as a first sub-block or sub-block A.

In FIG. 16G, when a current block is partitioned into two sub-blocks, a "⊏"-shaped region consisting of an upper partial region, a lower partial region and a left partial region of the current block may be defined as a first sub-block or sub-block A. In addition, the remaining region other than the first sub-block or sub-block A may be defined as a second sub-block or sub-block B.

In FIG. 16H, when a current block is divided into two sub-blocks, a "⊐"-shaped region consisting of an upper partial region, a lower partial region and a right partial region of the current block may be defined as a first sub-block or sub-block A. In addition, the remaining region other than the first sub-block or sub-block A may be defined as a second sub-block or sub-block B.

In FIG. 16I, when a current block is partitioned into two sub-blocks, a "⊔"-shaped region consisting of a lower partial region, a right partial region and a left partial region of the current block may be defined as a first sub-block or sub-block A. In addition, the remaining region other than the first sub-block or sub-block A may be defined as a second sub-block or sub-block B.

In FIG. 16J, when a current block is partitioned into two sub-blocks, a "⊓"-shaped region consisting of an upper partial region, a right partial region and a left partial region of the current block may be defined as a first sub-block or sub-block A. In addition, the remaining region other than the first sub-block or sub-block A may be defined as a second sub-block or sub-block B.

In FIG. 16K, when a current block is partitioned into two sub-blocks, the remaining region other than a center region (a second sub-block or sub-block B) of the current block may be defined as a first sub-block or sub-block A.

Meanwhile, a first sub-block (or sub-block A) and a second sub-block (or sub-block B) defined in FIGS. 16A to 16K may be interchanged with each other.

An encoder/decoder may store a table or list including a plurality of asymmetric partition shapes. An asymmetric partition shape of a current block determined in an encoder may be transmitted to a decoder in an index or flag form. In other words, on the basis of information (for example, angle and distance information) indicating a plurality of partition shapes and a table including the corresponding index, an encoder may transmit the index of the table to a decoder.

Meanwhile, an encoder/decoder may determine an asymmetric partition shape of a current block on the basis of a coding parameter of the current block. In addition, an encoder/decoder may determine an asymmetric partition shape of a current block on the basis of a neighboring block of the current block.

When a current block is partitioned into at least one asymmetric sub-block, a sub-block thus obtained may have a horizontal size and/or a vertical size equal to or smaller than a horizontal size (w) and/or a vertical size (h) of the current block.

In FIG. 16, when a current block is partitioned into two sub-blocks, the sub-blocks may have a horizontal size and/or a vertical size smaller than a horizontal size and/or a vertical size of the current block.

In FIGS. 16C to 16F, when a current block is partitioned into two sub-blocks, a second sub-block may have a horizontal size of (3/4)×w and a vertical size of (3/4)×h, respectively, in comparison with the current block.

In FIGS. 16G to 16H, when a current block is partitioned into two sub-blocks, a second sub-block may have a horizontal size of (3/4)×w and a vertical size of (2/4)×h, respectively, in comparison with the current block.

In FIGS. 16I to 16J, when a current block is partitioned into two sub-blocks, a second sub-block may have a horizontal size of (2/4)×w and a vertical size of (3/4)×h, respectively, in comparison with the current block.

In FIG. 16K, a second sub-block may have a horizontal size of (2/4)×w and a vertical size of (2/4)×h, respectively, in comparison with the current block.

Meanwhile, the above-described ratios of the horizontal size and/or vertical size of a second sub-block may be predefined in an encoder or be obtained based on information that is signaled from an encoder to a decoder.

A current block (CU) may have a square shape or a rectangular shape or both. In addition, a current block may be partitioned into at least one asymmetric sub-block by using the above-described method so that intra-prediction and/or inter-prediction information may be derived. Herein, each sub-block may derive intra-prediction and/or inter-prediction information in a lowest level sub-block unit, and the lowest level sub-block may mean a smallest block unit with a predetermined size. For example, a 4×4 block size may be defined as a lowest level sub-block.

In addition, information on the size of the lowest level sub-block may be entropy encoded/decoded in at least one unit of a video parameter set (VPS), a sequence parameter set (SPS), a picture parameter set (PPS), a tile header, a slice header, a CTU, and a CU.

A current block (CU) may mean a quad-tree, binary-tree and/or ternary-tree lead node, and intra prediction and/or inter prediction, primary/secondary transform and inverse-transform, quantization, dequantization, entropy encoding/decoding, and/or in-loop filtering encoding/decoding may be performed in a unit of a sub-block size, shape and/or depth.

A current block (CU) may mean a quad-tree, binary-tree and/or ternary-tree leaf node. At least one encoding/decoding process among intra/inter prediction, primary/secondary transform and inverse-transform, quantization, dequantization, entropy encoding/decoding, and in-loop filtering encoding/decoding for the current block may be performed in a unit of a sub-block size, shape and/or depth.

For example, when encoding a current block (CU), intra/inter prediction may be performed in a unit of a sub-block size, shape and depth, and the remaining processes other than intra/inter prediction such as primary/secondary transform and inverse-transform, quantization, dequantization, entropy encoding/decoding and in-loop filtering may be performed in a unit of a size, shape and/or depth of the current block.

For another example, when a current block is divided into two sub-blocks (for example, a first sub-block and a second sub-block), the first sub-block and the second sub-block may derive different pieces of intra-prediction information.

For yet another example, when a current block is divided into two sub-blocks (for example, a first sub-block and a second sub-block), the first sub-block and the second sub-block may derive different pieces of inter-prediction information.

For yet another example, when a current block is divided into two sub-blocks (for example, a first sub-block and a second sub-block), the first sub-block and the second sub-block may derive combined intra- and/or inter-prediction information. Herein, a first sub-block may derive inter-prediction information, and a second sub-block may derive intra-prediction information. Alternatively, a first sub-block may derive intra-prediction information, and a second sub-block may derive inter-prediction information.

For yet another example, when encoding a current block (CU), primary/secondary transform and inverse transform may be performed in a unit of a sub-block size, shape and/or depth. Apart from the primary/secondary transform and inverse transform, the remaining processes such as intra and/or inter prediction, quantization, dequantization, entropy encoding/decoding, and in-loop filtering may be performed in a unit of a size, shape and/or depth of the current block.

For yet another example, when a current block is divided into two sub-blocks (for example, a first sub-block and a second sub-block), a primary/secondary transform process and an inverse transform process of the first sub-block and/or the second sub-block may be skipped. Alternatively, different primary/secondary transform processes and inverse transform processes may be performed.

For yet another example, when a current block is divided into two sub-blocks (for example, a first sub-block and a second sub-block), a secondary transform process and an inverse transform process of the first sub-block and/or the second sub-block may be skipped. Alternatively, different primary/secondary transform processes and different inverse transform processes may be performed.

For yet another example, when encoding a current block (CU), quantization and dequantization may be performed in a unit of a sub-block size, shape and/or depth. Apart from quantization and dequantization, the remaining processes such as intra and/or inter prediction, primary/secondary transform and inverse transform, entropy encoding/decoding, and in-loop filtering may be performed in a unit of a size, shape and/or depth of the current block.

For yet another example, when a current block is divided into two sub-blocks (for example, a first sub-block and a second sub-block), a quantization and dequantization process of the first sub-block and/or the second sub-block may be skipped. Alternatively, different quantization and dequantization processes may be performed.

For yet another example, when a current block is divided into two sub-blocks (for example, a first sub-block and a second sub-block), the first sub-block may be quantized according to a quantization parameter that is set in first encoding, and the second sub-block may be encoded/decoded by using a quantization parameter different from the initially-set quantization parameter. Herein, a quantization parameter and/or an offset of a second sub-block that is different from a quantization parameter set in first encoding may be explicitly transmitted or be implicitly derived according to a method set in an encoder/decoder.

For yet another example, when a current block is partitioned into two sub-blocks (for example, a first sub-block and a second sub-block), the second sub-block may be quantized according to a quantization parameter that is set in first encoding, and the first sub-block may be encoded/decoded by using a quantization parameter different from the initially-set quantization parameter. Herein, a quantization parameter and/or an offset of a first sub-block that is different from a quantization parameter set in first encoding may be explicitly transmitted or be implicitly derived according to a method set in an encoder/decoder.

For yet another example, when encoding a current block (CU), entropy encoding/decoding may be performed in a unit of a sub-block size, shape and/or depth. Apart from entropy encoding/decoding, the remaining processes such as intra and/or inter prediction, primary/secondary transform and inverse transform, quantization and dequantization, and in-loop filtering may be performed in a unit of a size, shape and/or depth of the current block.

For yet another example, when encoding a current block (CU), in-loop filtering may be performed in a unit of a sub-block size, shape and/or depth. Apart from in-loop filtering, the remaining processes such as intra and/or inter prediction, primary/secondary transform and inverse transform, quantization, dequantization, and entropy encoding/decoding may be performed in a unit of a size, shape and/or depth of the current block.

For yet another example, when a current block is divided into two sub-blocks (for example, a first sub-block and a second sub-block), in-loop filtering of the first sub-block and/or the second sub-block may be skipped. Alternatively, different in-loop filtering processes may be performed.

When a current block is divided into at least one symmetric and/or asymmetric sub-block, a flag indicating whether or not partitioning into sub-blocks is performed and/or index information on a sub-block partition type may be signaled in a block (CU) unit through a bitstream. For example, index information on an asymmetric sub-block partition type may be signaled in at least one level of a sequence, a picture, a sub-picture, a slice, a tile, a CTU, and a CU. In addition, a flag indicating whether or not asymmetric sub-block partitioning is possible may be signaled in a sequence level. Alternatively, a flag indicating whether or not asymmetric sub-block partitioning is possible may be variably derived based on a coding parameter of a current block. For example, a flag indicating whether or not asymmetric sub-block partitioning is possible may not be signaled through a bitstream but be implicitly derived based on a coding parameter of a current block (for example, a size of a current block, a prediction mode of a current block, a slice type, and a flag indicating whether or not asymmetric sub-block partitioning is possible, etc.). Herein, a sub-block partition type may be defined by using at least one of the asymmetric sub-block partition types described in FIGS. 16A to 16K, and then encoding/decoding of a current block may be performed. Alternatively, a sub-block partition type may be a block shape that is predefined in an encoder/decoder and is different from the asymmetric sub-block partition types described in FIGS. 16A to 16K. At least one of sub-blocks obtained by partitioning may have an arbitrary block shape other than square and/or rectangle. Meanwhile, a sub-block partition type may include information on a direction of partitioning a current block into sub-blocks, a sub-block shape, a shape relation between the current block and a sub-block and/or a shape relation between sub-blocks.

For example, when at least one of the types of FIGS. 16A to 16K is used, a flag indicating whether or not subblock-based encoding and decoding are performed and/or a sub-block partitioning index (or a sub-block partition type) may be signaled through a bitstream or be variably derived on the basis of a coding parameter of a current block. Herein, when index information is explicitly transmitted, it is possible to use at least one binarization method among a truncated rice binarization method, a K-th order exp_golomb binarization method, a restricted K-th order exp_golomb binarization method, a fixed-length binarization method, a unary binarization method, and a truncated unary binarization method. In addition, after binarization, a current block may be finally encoded/decoded using CABAC (ac (v)).

In addition, for example, when at least one of the two types of FIGS. 16A to 16B, a flag indicating whether or not to perform triangular sub-block partitioning for a current block (CU) may be signaled.

The flag may be signaled in at least one unit of a video parameter set (VPS), a sequence parameter set (SPS), a picture parameter set (PPS), a tile header, a slice header, a CTU, and a CU. Also, in the case of a specific slice (for example, B slice), the flag may be signaled.

In addition, when triangular sub-block partitioning is performed for a current block (CU) is performed, an index indicating at least one of a direction of partitioning the CU into the triangular sub-blocks and motion information of the triangular sub-blocks may be signaled. The index may be variably derived on the basis of a coding parameter of the current block.

Meanwhile, when the flag indicates a first value, it may indicate that motion prediction/compensation based on a triangular sub-block is used to generate a prediction sample of a current block (CU). In addition, meanwhile, the index may be signaled only when the flag indicates a first value.

An index range may be from 0 to M. M may be a positive integer greater than 0. For example, M may be 39.

In addition, an encoder/decoder may store a table or a list for deriving a direction of partitioning a current block into arbitrary sub-blocks and/or motion information of the sub-blocks from the index.

Table 1 is an example of a look-up table showing a direction of partitioning a current block into triangular sub-blocks. Based on the above-described index, a direction of partitioning into triangular sub-blocks may be derived.

Meanwhile, an index (merge_triangle_idx) indicating a partitioning direction of the sub-blocks may range from 0 to 39. The index may be signaled for a current block. The index information may be identical to index information indicating a merge candidate used in each sub-block that will be described in Table 2 below.

In addition, for example, a current block may be divided into two sub-blocks by a straight line, and a prediction sample of the current block may be generated by performing motion prediction/compensation for the sub-blocks. A flag indicating whether or not motion prediction/compensation is possible based on sub-blocks obtained by partitioning through a straight line may be signaled.

The flag may be signaled in at least one unit of a video parameter set (VPS), a sequence parameter set (SPS), a picture parameter set (PPS), a tile header, a slice header, a CTU, and a CU. Also, in the case of a specific slice (for example, B slice), the flag may be signaled.

Meanwhile, when the flag indicates a first value, information indicating whether or not motion prediction/compensation based on a sub-block obtained by partitioning through a straight line is performed may be derived. In addition, information indicating whether or not motion prediction/compensation based on a sub-block obtained by partitioning through a straight line is performed may be variably derived based on a coding parameter of a current block. For example, information indicating whether or not motion prediction/compensation based on a sub-block obtained by partitioning through a straight line is performed may be implicitly derived based on a coding parameter of a current block (for example, a size of a current block, a prediction mode of a current block, a slice type, etc.).

In addition, when sub-block partitioning for a current block (CU) is performed using a straight line, an index indicating at least one of angle information and distance information for the straight line may be signaled. The index may be variably derived on the basis of a coding parameter of the current block.

In addition, meanwhile, the index may be signaled only when the flag indicates a first value.

An index range may be from 0 to M. M may be a positive integer greater than 0. For example, M may be 63.

In addition, an encoder/decoder may store a table or a list for deriving a direction of partitioning a current block into arbitrary sub-blocks and/or motion information of the sub-blocks from the index.

TABLE 1

| merge_triangle_idx[ xCb ][ yCb ] | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| TriangleDir | 0 | 1 | 1 | 0 | 0 | 1 | 1 | 1 | 0 | 0 | 0 | 0 | 1 | 0 | 0 | 0 | 0 | 1 | 1 | 1 |
| merge_triangle_idx[ xCb ][ yCb ] | 20 | 21 | 22 | 23 | 24 | 25 | 26 | 27 | 28 | 29 | 30 | 31 | 32 | 33 | 34 | 35 | 36 | 37 | 38 | 39 |
| TriangleDir | 1 | 0 | 0 | 1 | 1 | 1 | 1 | 1 | 1 | 1 | 0 | 0 | 1 | 0 | 1 | 0 | 0 | 1 | 0 | 0 |

Referring to Table 1, when TriangleDir has a first value of 0, it may mean that a current block is divided into two triangular sub-blocks with a diagonal boundary from top left to bottom right. For example, it may mean the partition shape of FIG. 16A. In addition, when TriangleDir has a second value of 1, it may mean that a current block is divided into two triangular sub-blocks with a diagonal boundary from top right to bottom left. For example, it may mean the partition shape of FIG. 16B. Meanwhile, a first value and a second value may be interchanged with each other.

Meanwhile, at least one of a flag and an index that are entropy-coded in an encoder and entropy-decoded in a decoder may use at least one of the following binarization methods.

Truncated rice binarization method

K-th order Exp_Golomb binarization method

Limited K-th order Exp_Golomb binarization method

Fixed-length binarization method

Unary binarization method

Truncated unary binarization method

Hereinafter, a method of deriving intra sub-block and/ inter sub-block prediction information will be described.

When a current block is divided into at least one symmetric and/or asymmetric sub-block, each sub-block thus obtained may derive prediction information of the current block by using at least one of the following methods: deriving different pieces of intra-prediction information between sub-blocks, deriving different pieces of inter-prediction information between sub-blocks, and deriving combined intra/inter-prediction information between sub-blocks.

Inter-prediction information may mean motion information used for motion prediction/compensation (for example, at least one of a motion vector, an inter-prediction indicator, a reference picture index, a picture order count, a skip flag, a merge flag, a merge index, an affine flag, an OBMC flag, a bi-directional matching and/or template matching flag, and a bi-directional optical flow (BIO) flag). Meanwhile, inter-prediction information and motion information may be defined to have the same meaning.

Intra-prediction information may mean intra-prediction mode information used to generate an intra-prediction block (for example, at least one of an MPM flag, an MPM index, a selected modes set flag, a selected mode index, and a remaining mode index).

Inter and/or intra-prediction information may be explicitly transmitted from an encoder to a decoder through a bitstream or may be variably derived on the basis of a shape, size and/or depth of a current block and/or a sub-block. In addition, inter and/or intra-prediction information may be variably derived based on a coding parameter of a current block and/or a sub-block or may be signaled through a bitstream.

Hereinafter, a method of deriving inter prediction information between sub-blocks will be described.

When a current block is divided into at least one symmetric and/or asymmetric sub-block, each of sub-blocks thus obtained may derive different pieces of inter-prediction information. Herein, each sub-block may derive inter-prediction information by using at least one inter-prediction method of a skip mode, a merge mode, an AMVP mode, motion prediction/compensation using an affine transform equation, bi-directional matching-based motion prediction/ compensation, template matching-based motion prediction/ compensation, and OBMC-based motion prediction/compensation.

When a current block is divided into two sub-blocks, a first sub-block (or sub-block A) and/or a second sub-block (or sub-block B) may derive different pieces of inter-prediction information. When deriving inter-prediction information for a first sub-block, motion information may be derived by using at least one inter-prediction method of a skip mode, a merge mode, an AMVP mode, motion prediction/compensation using an affine transform equation, bi-directional matching-based motion prediction/compensation, template matching-based motion prediction/ compensation, and OBMC-based motion prediction/ compensation. In addition, when deriving inter-prediction information for a second sub-block, motion information may be derived by using at least one inter-prediction method of a skip mode, a merge mode, an AMVP mode, motion prediction/compensation using an affine transform equation, bi-directional matching-based motion prediction/compensation, template matching-based motion prediction/compensation, and OBMC-based motion prediction/compensation.

When a current block is divided into two sub-blocks, each sub-block may derive motion information in a lowest level sub-block unit. Here, a lowest level sub-block may mean a smallest block unit having a predetermined value. For example, a 4×4 block size may be defined as a lowest level sub-block.

When a current block is divided into two sub-blocks, all the sub-blocks may perform different motion predictions/ compensations based on a skip mode according to the shape of each sub-block. Herein, a current block may explicitly transmit two different pieces of motion information (for example, at least one of a skip flag and/or merge index information and a picture order count).

When a current block is divided into two sub-blocks, all the sub-blocks may perform different motion predictions/ compensations based on a merge mode according to the shape of each sub-block. Herein, a current block may explicitly transmit two different pieces of motion information (for example, at least one of a merge flag and/or merge index information and a picture order count).

When a current block is divided into two sub-blocks, a first sub-block and/or a second sub-block may perform motion prediction/compensation on the basis of different pieces of motion information based on a merge mode. Herein, a current block may derive two different pieces of motion information on the basis of different merge modes in each sub-block by configuring a single merge candidate list. For example, a current block may configure a merge candidate list including N merge candidates by using a spatial merge candidate, a temporal merge candidate, a combined merge candidate, and a zero merge candidate, and then may derive motion information by using different merge candidates in each sub-block obtained by partitioning. The N may mean a natural number greater than 0. When the merge candidate list is configured, if a corresponding merge candidate has bi-directional motion information, the merge candidate list may consist only of uni-directional prediction candidates in order to reduce a memory bandwidth. For example, in the bi-directional motion information, only L0 or L1 motion information may be added to a list. Alternatively, an average value or a weighted sum for L0 and L1 motion information may be added to a list. Meanwhile, when different merge candidates are used in each sub-block, a pre-defined value may be used.

For example, when different merge candidates are used for each sub-block, N-th candidate in a merge candidate list may be used for a first sub-block (or a sub-block A), and M-th candidate in the merge candidate list may be used for a second sub-block (or a sub-block B). N and M may be natural numbers including 0 and may not be identical with each other. Meanwhile, N and M may be values that are predefined in an encoder/decoder.

For another example, in order to use a different merge candidate for each sub-block, a first merge index and a second merge index may be signaled for a first sub-block and a second sub-block respectively.

For yet another example, when using a different merge candidate for each sub-block, for a merge candidate (or index information of a merge candidate) corresponding to each sub-block, a merge candidate group (or merge candidate group list or table) may be defined and used. The merge candidate group may include a pair of merge candidates for each sub-block as an element. In addition, when the number of merge candidates configured with a spatial merge candidate, a temporal merge candidate, a combined merge candidate, a zero merge candidate, etc. is N, each merge candidate corresponding to each sub-block may have a value from 0 to N−1. Herein, N is a natural number including 0.

Table 2 shows an example of a look-up table representing a merge candidate used in each sub-block.

TABLE 2

| merge_triangle_idx[ xCb ][ yCb ] | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| A | 1 | 0 | 0 | 0 | 2 | 0 | 0 | 1 | 3 | 4 | 0 | 1 | 1 | 0 | 0 | 1 | 1 | 1 | 1 | 2 |
| B | 0 | 1 | 2 | 1 | 0 | 3 | 4 | 0 | 0 | 0 | 2 | 2 | 2 | 4 | 3 | 3 | 4 | 4 | 3 | 1 |

| merge_triangle_idx[ xCb ][ yCb ] | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| A | 2 | 2 | 4 | 3 | 3 | 3 | 4 | 3 | 2 | 4 | 4 | 2 | 4 | 3 | 4 | 3 | 2 | 2 | 4 | 3 |
| B | 0 | 1 | 3 | 0 | 2 | 4 | 0 | 1 | 3 | 1 | 1 | 3 | 2 | 2 | 3 | 1 | 4 | 4 | 2 | 4 |

Referring to Table 2, as shown in FIG. 16A or 16B, when a current block is divided into two triangular sub-blocks, A may mean a first sub-block (or sub-block A), and B may mean a second sub-block (or sub-block B). In addition, when the number of merge candidates configured with a spatial merge candidate, a temporal merge candidate, a combined merge candidate, a zero merge candidate, etc. is 5, A and B may have a value from 0 to 4 respectively.

Meanwhile, a range of an index (merge_triangle_idx) indicating index information of a merge candidate mapped to each of the sub-blocks may be from 0 to M. M may be a positive integer greater than 0. For example, in Table 2, M may be 39. The index may be signaled for a current block. Accordingly, motion information of a sub-block may be derived on the basis of the index. Meanwhile, the index information may be identical to index information indicating partition direction information of a sub-block described in Table 1.

Meanwhile, an encoder/decoder may store a table or a list for deriving a direction of partitioning a current block into arbitrary sub-blocks and/or motion information of the sub-blocks from the index.

When a current block is divided into two sub-blocks, a first sub-block may perform bi-directional matching-based motion prediction/compensation, and a second sub-block may perform template matching-based motion prediction/compensation. Herein, motion information of each sub-block (for example, at least one of a motion vector, an inter-prediction indicator, a reference picture index, and a POC) may be explicitly transmitted from an encoder, or may be implicitly derived in an encoder/decoder.

When a current block is divided into two sub-blocks, a first sub-block may perform template matching-based motion prediction/compensation, and a second sub-block may perform bi-directional matching-based motion prediction/compensation. Herein, motion information of each sub-block (for example, at least one of a motion vector, an inter-prediction indicator, a reference picture index, and a POC) may be explicitly transmitted from an encoder, or may be implicitly derived in an encoder/decoder.

When a current block is divided into two sub-blocks, a first sub-block may perform motion prediction/compensation by using motion information of a spatial neighboring block, and a second sub-block may derive inter-prediction information by using at least one inter-prediction method of a skip mode, a merge mode, an AMVP mode, motion prediction/compensation using an affine transform equation, bi-directional matching-based motion prediction/compensation, template matching-based motion prediction/compensation, and OBMC-based motion prediction/compensation.

When a current block is divided into two sub-blocks, a second sub-block may perform motion prediction/compensation by using motion information of a spatial neighboring block, and a first sub-block may derive inter-prediction information by using at least one inter-prediction method of a skip mode, a merge mode, an AMVP mode, motion prediction/compensation using an affine transform equation, bi-directional matching-based motion prediction/compensation, template matching-based motion prediction/compensation, and OBMC-based motion prediction/compensation.

Meanwhile, based on inter-prediction information (that is, motion information) of a first sub-block and a second sub-block derived by the above-described method, inter prediction may be performed for each of the first sub-block and the second sub-block and thus prediction samples may be generated for each sub-block. In addition, a final prediction sample of a current block may be derived through a weighted sum of prediction samples that are generated for two sub-blocks.

Meanwhile, a first sub-block and/or a second sub-block that performs motion prediction/compensation by using motion information of a spatial neighboring block may derive motion information in a lowest level sub-block unit having a predetermined size.

When a current block is divided into two sub-blocks, motion information for a current block may be stored by using at least one of motion information of a first sub-block, motion information of a second sub-block, and third motion information generated through the first sub-block and the second sub-block. The motion information may be stored in a unit of N×N size. In addition, the motion information may be stored in a motion information buffer of a temporal neighboring picture for temporal motion information prediction and be used to predict motion information of a spatial neighboring block. N may be a positive integer greater than 0 and have at least one value of 2, 4, 8, 16, 32, 64, 128 and 256. For example, motion information may be stored in 4×4 unit.

For example, when a current block is divided into two sub-blocks, each sub-block may have uni-directional motion information. A region for storing uni-directional motion information of a first sub-block may be defined as a type 0 (sType=0), and a region for storing uni-directional motion information of a second sub-block may be defined as a type 1 (sType=1). The type 0 and the type 1 may be defined opposite to each other. In addition, a region for storing third motion information that is generated through motion information of a first sub-block and motion information of a second sub-block may be defined as a type 2 (sType=2). Motion information corresponding to at least one of the type 0, the type 1, and the type 2 may be stored in each N×N motion information storage unit. For example, when a motion information storage unit is 4×4, a type may be derived in each 4×4 size, as illustrated in FIGS. 18 to 21.

Meanwhile, a motion information storage unit may be different according to motion information of a first sub-block, motion information of a second sub-block, or third motion information. In addition, a motion information storage unit may be different according to a type 0, a type 1 or a type 2.

A motion information type in each motion information storage unit may be derived based on at least one of the number of horizontal/vertical blocks, a width-height ratio, and partition direction information, as described below.

$$-\min Sb = \min - (numSbX, numSbY) - 1$$

Here, numSbX is the number of N×N horizontal blocks, and numSbY is the number of N×N vertical blocks. For example, when a motion information storage unit is 4×4, numSbX and numSbY mean the numbers of 4×4 blocks in the horizontal and vertical directions respectively. Min ( ) means a function for calculating a minimum value.

−CbRatio=(cbWidth>cbHeight)?(cbWidth/cbHeight):
(cbHeight/cbWidth)

Here, cbWidth means a width of a current block, and cbHeight means a height of a current block.

$$-(xSbIdx, ySbIdx)xSbIdx = 0 \sim numSbX - 1, ySbIdx = 0 \sim numSbY - 1$$

Here, (xSbIdx, ySbIdx) means an index of N×N sub-block of a current block. For example, when a motion information storage unit is 4×4, (xSbIdx, ySbIdx) means an index of each 4×4 sub-block.

For each N×N sub-block, a motion information type may be determined as follows.

xIdx=(cbWidth>cbHeight)?(xSbIdx/cbRatio):xSbIdx yIdx=(cbWidth>cbHeight)?ySbIdx:(ySbIdx/cbRatio)

When a sub-block partitioning direction is from top left to bottom right, that is, when partitioning direction information has a first value (0), $$sType = (xIdx = ? yIdx)?2: \big((xIdx > yIdx)?0: 1\big)$$

When a sub-block partitioning is from top right to bottom left, that is, when partitioning direction information has a second value (1), $$sType = (xIdx == yIdx)?2: \big((xIdx > yIdx)?0: 1\big)$$

When minSb is defined as min (numSbX, numSbY), the equation may be defined as follows.

$$sType = (xIdx + yIdx == \min Sb)?2: \big((xIdx + yIdx < \min Sb)?0: 1\big)$$

Figures 19, 20, 21:
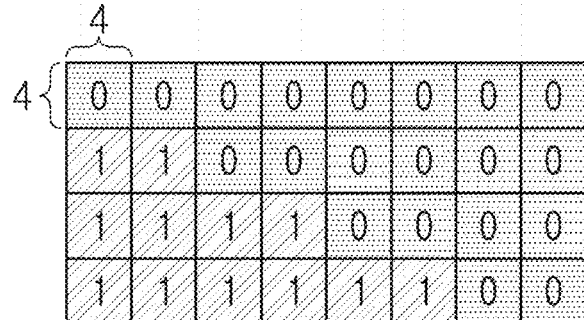

As shown in FIG. 16A and FIG. 16B, when a current block is diagonally divided into two sub-blocks, a region for storing uni-directional motion information of an upper sub-block may be defined as a type 0 (sType=0), and a region for storing uni-directional motion information of a lower sub-block may be defined as a type 1 (sType=1). In each motion information storage unit, motion information corresponding to at least one of the type 1 and the type 2 may be stored. For example, when a motion information storage unit is 4×4, a type may be derived in each 4×4 size, as illustrated in FIGS. 19 to 20.

When a sub-block partitioning direction is from top left to bottom right, that is, when partitioning direction information has a first value (0), $$sType = \big((xIdx >= yIdx)?0: 1\big)$$

When a sub-block partitioning is from top right to bottom left, that is, when partitioning direction information has a second value (1), $$sType = (xIdx + yIdx < \min Sb)?0: 1\big)$$

Here, minSb may be defined as min (numSbX, numSbY).

Meanwhile, as shown in FIG. 16A and FIG. 16B, when a current block is diagonally divided into two sub-blocks, motion information may be stored by using only a type 2 (sType=2), that is, third motion information generated through uni-directional motion information of an upper sub-block and uni-directional motion information of a lower sub-block. For example, when a motion information storage unit is 4×4, only a type 2 may be used for each 4×4 size, as illustrated in FIG. 21.

Meanwhile, as shown in FIG. 16A and FIG. 16B, when a current block is diagonally divided into two sub-blocks, motion information for the current block may be stored in N×N motion information storage unit by using only uni-directional motion information (sType=0) of an upper sub-block.

Meanwhile, as shown in FIG. 16A and FIG. 16B, when a current block is diagonally divided into two sub-blocks, motion information for the current block may be stored in N×N motion information storage unit by using only uni-directional motion information (sType=1) of a lower sub-block.

As shown in FIG. 16A and FIG. 16B, when a current block is diagonally divided into two sub-blocks, only uni-directional information of an upper sub-block or uni-directional information of a lower sub-block may be stored in N×N motion information storage unit on the basis of sub-block partitioning direction information.

For example, as shown in FIG. 16A, when a current block is divided from top left to bottom right, uni-directional motion information of an upper sub-block may be stored in N×N motion information storage unit. On the contrary, uni-directional motion information of a lower sub-block may be stored in N×N motion information storage unit.

For example, as shown in FIG. 16B, when a current is divided from top right to bottom left, uni-directional motion information of a lower sub-block may be stored in N×N motion information storage unit. On the contrary, uni-directional motion information of an upper sub-block may be stored in N×N motion information storage unit.

When a motion information type derived in the N×N motion information storage unit is a type 2 (sType=2), third motion information may be derived according to the direction of a reference picture (or the type of a reference picture list) referenced by uni-directional motion information of each sub-block, as described below.

When uni-directional motion information of a first sub-block and uni-directional motion information of a second sub-block refer to reference pictures in different directions (for example, when motion information of a first sub-block refers to L0 reference picture and motion information of a second sub-block refers to L1 reference picture), third motion information may be generated in a shape of bi-directional motion information by combining uni-directional motion information of the first sub-block and uni-directional motion information of the second sub-block.

On the contrary, when uni-directional motion information of a first sub-block and uni-directional motion information of a second sub-block refer to reference pictures in the same direction (for example, when motion information of a first sub-block refers to L0 reference picture and motion information of a second sub-block refers to L0 reference picture), third motion information may be set as any one of the motion information of the first sub-block and the motion information of the second sub-block.

In addition, when a motion information type is a type 2 (sType=2), third motion information may be derived according to the direction of a reference picture (or the type of a reference picture list) referenced by uni-directional motion information of each sub-block, as described below.

When uni-directional motion information of a first sub-block and uni-directional motion information of a second sub-block refer to reference pictures in different directions, motion information of the first sub-block may be used as L0 motion information of third motion information, and motion information of the second sub-block may be used as L1 motion information of third motion information. When uni-directional motion information of a first sub-block and uni-directional motion information of a second sub-block commonly refer to L0 reference picture, third motion information may be set as follows.

When motion information of a first sub-block is used as L0 motion information and there is, among L1 reference pictures, a reference picture having a same POC value as L0 reference picture indicated by motion information of a second sub-block, a motion vector of the second sub-block may be used as L1 motion vector, and a reference picture index of L1 reference picture having a same POC value may be used as L1 reference picture index.

When, as described above, there is, among L1 reference pictures, no reference picture having a same POC value as L0 reference picture indicated by motion information of a second sub-block, the motion information of the second sub-block may be used as L0 motion information. In addition, when there is, among L1 reference pictures, a reference picture having a same POC value as L0 reference picture indicated by motion information of a first sub-block, a motion vector of the first sub-block may be used as L1 motion vector, and a reference picture index of L1 reference picture having a same POC value may be used as L1 reference picture index.

When none of the conditions is satisfied, motion information of a first sub-block may be used as L0 motion information and L1 motion information may be set as unavailable. In other words, L1 motion vector may be set as (0, 0) for the horizontal and vertical directions, and L1 reference picture index may be set as a value of −1. For another example, motion information of a second sub-block may be used as L0 motion information, and L1 motion information may be set as unavailable. In other words, L1 motion vector may be set as (0, 0) for the horizontal and vertical directions, and L1 reference picture index may be set as a value of −1.

For yet another example, without a process for searching for a reference picture having a same POC value for L1 direction, L0 motion vector in L0 motion information may be set as a value that is derived by using at least one of an average value, a minimum value and a maximum value of motion vectors of a first sub-block and a second sub-block, and L0 reference picture index may be set as a reference picture index of the first sub-block or a reference picture index of the second sub-block. L1 motion vector may be set as (0, 0) for the horizontal and vertical directions, and L1 reference picture index may be set as a value of −1.

For yet another example, without a process for searching for a reference picture having a same POC value for L1 direction, motion information of a defined sub-block that is either a first sub-block or a second sub-block may be set as L0 motion information, L1 motion vector may be set as (0, 0) for the horizontal and vertical directions, and L1 reference picture index may be set as a value of −1. For example, motion information of a first sub-block may be used as L0 motion information. For example, motion information of a second sub-block may be used as L0 motion information.

For yet another example, without a process for searching for a reference picture having a same POC value for L1 direction, motion information of a sub-block may be set as L0 motion information on the basis of sub-block partitioning direction information that is either motion information of a first sub-block or motion information of a second sub-block, L1 motion vector may be set as (0, 0) for the horizontal and vertical directions, and L1 reference picture index may be set as a value of −1. For example, when a current block is divided from top left to bottom right as illustrated in FIG. 16A, motion information of an upper sub-block may be set as L0 motion information. When a current block is divided from top right to bottom left as illustrated in FIG. 16B, motion information of a lower sub-block may be set as L0 motion information. On the contrary, when a current block is divided from top left to bottom right as illustrated in FIG. 16A, motion information of a lower sub-block may be set as L0 motion information. When a current block is divided from top right to bottom left as illustrated in FIG. 16B, motion information of an upper sub-block may be set as L0 motion information.

When uni-directional motion information of a first sub-block and uni-directional motion information of a second sub-block commonly refer to L1 reference picture, third motion information may be set as follows.

When motion information of a first sub-block is used as L1 motion information and there is, among L0 reference pictures, a reference picture having a same POC value as L1 reference picture indicated by motion information of a second sub-block, a motion vector of the second sub-block may be used as L0 motion vector, and a reference picture index of L0 reference picture having a same POC value may be used as L0 reference picture index.

When, as described above, there is, among L0 reference pictures, no reference picture having a same POC value as L1 reference picture indicated by motion information of a second sub-block, the motion information of the second sub-block may be used as L1 motion information. In addition, when there is, among L0 reference pictures, a reference picture having a same POC value as L1 reference picture indicated by motion information of a first sub-block, a motion vector of the first sub-block may be used as L0 motion vector, and a reference picture index of L0 reference picture having a same POC value may be used as L0 reference picture index.

When none of the conditions is satisfied, motion information of a first sub-block may be used as L1 motion information and L0 motion information may be set as unavailable. In other words, L0 motion vector may be set as (0, 0) for the horizontal and vertical directions, and L0 reference picture index may be set as a value of −1. For another example, motion information of a second sub-block may be used as L1 motion information, and L0 motion information may be set as unavailable. In other words, L0 motion vector may be set as (0, 0) for the horizontal and vertical directions, and L0 reference picture index may be set as a value of −1.

For yet another example, without a process for searching for a reference picture having a same POC value for L0 direction, L1 motion vector in L1 motion information may be set a value that is derived by using at least one of an average value, a minimum value and a maximum value of motion vectors of a first sub-block and a second sub-block, and L1 reference picture index may be set as a reference picture index of the first sub-block or a reference picture index of the second sub-block. L0 motion vector may be set as (0, 0) for the horizontal and vertical directions, and L0 reference picture index may be set as a value of −1.

For yet another example, without a process for searching for a reference picture having a same POC value for L0 direction, motion information of a defined sub-block that is either a first sub-block or a second sub-block may be set as L1 motion information, L0 motion vector may be set as (0, 0) for the horizontal and vertical directions, and L0 reference picture index may be set as a value of −1. For example, motion information of a first sub-block may be used as L1 motion information. For example, motion information of a second sub-block may be used as L1 motion information.

For yet another example, without a process for searching for a reference picture having a same POC value for L0 direction, motion information of a sub-block may be set as L1 motion information on the basis of sub-block partitioning direction information that is either motion information of a first sub-block or motion information of a second sub-block, L0 motion vector may be set as (0, 0) for the horizontal and vertical directions, and L0 reference picture index may be set as a value of −1. For example, when a current block is divided from top left to bottom right as illustrated in FIG. 16A, motion information of an upper sub-block may be set as L1 motion information. When a current block is divided from top right to bottom left as illustrated in FIG. 16B, motion information of a lower sub-block may be set as L1 motion information. On the contrary, when a current block is divided from top left to bottom right as illustrated in FIG. 16A, motion information of a lower sub-block may be set as L1 motion information. When a current block is divided from top right to bottom left as illustrated in FIG. 16B, motion information of an upper sub-block may be set as L1 motion information.

Figures 17, 18:
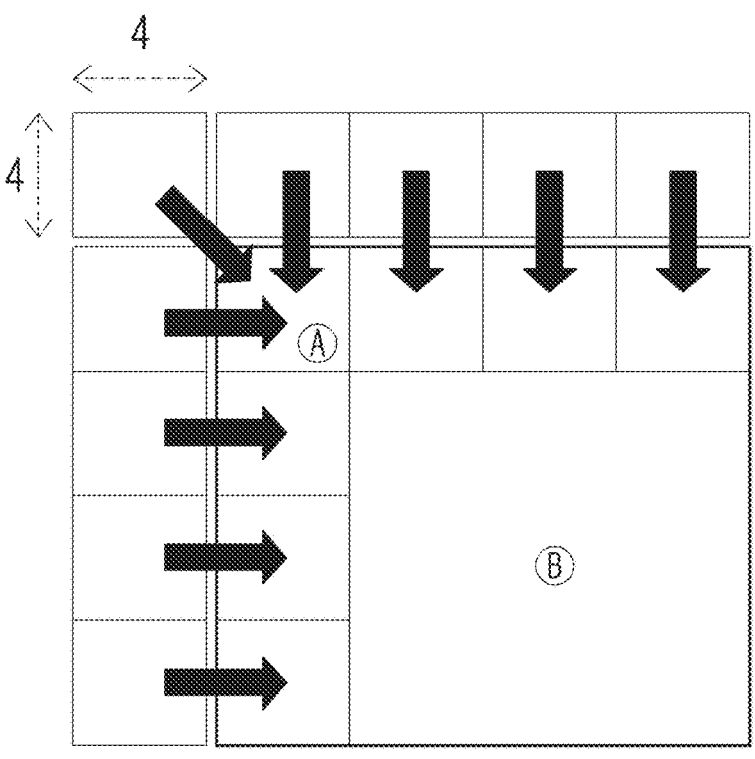
FIG. 17 is a view showing a method of deriving motion prediction information of a sub-block by using a lowest level sub-block according to an embodiment of the present invention.
FIGS. 18 to 21 are views showing a type of storing motion information for each block according to an embodiment of the present invention.

FIG. 17 is a view showing a method of deriving motion prediction information of a sub-block by using a lowest level sub-block according to an embodiment of the present invention.

In FIG. 16C, when a current block is divided into two asymmetric sub-blocks and a first sub-block performs motion prediction/compensation by using motion information of a spatial neighboring block, referring to FIG. 17, motion prediction/compensation of the first sub-block may be performed in a lowest level sub-block unit of the first sub-block and thus may implicitly derive motion information of a spatially adjacent lowest level sub-block positioned to the left and/or top of the lowest level sub-block as motion information of the first sub-block. Herein, a size of the lowest level sub-block may be 4×4. Herein, the second sub-block may explicitly derive motion information by using an AMVP mode.

In FIG. 17, motion information of a top left lowest level sub-block among lowest level sub-blocks of a first sub-block may be derived by using at least one of the motion information of a spatially adjacent left lowest level sub-block, the motion information of a spatially adjacent top lowest level sub-block, and the motion information of a spatially adjacent top left lowest level sub-block. Herein, the motion information of the top left lowest level sub-block may use motion information of one lowest level sub-block among spatially adjacent left, top, and left top lowest level sub-blocks. Alternatively, motion information may be derived on the basis of at least one of an average value, a mode, and a weighted sum of up to three adjacent lowest level sub-blocks.

In FIG. 17, motion information of a lowest level sub-block of a first sub-block may be derived by using at least one of a spatially adjacent left lowest level sub-block and/or a spatially adjacent top lowest level sub-block.

In FIG. 17, when motion information is not present in a spatially adjacent left lowest level sub-block or a spatially adjacent top lowest level sub-block or both, motion information of a lowest level sub-block of a first sub-block may be derived in a lowest level sub-block to the left and/or top of the spatially adjacent left lowest level sub-block and/or the spatially adjacent top lowest level sub-block.

In FIG. 17, when motion information is not present in a spatially adjacent left lowest level sub-block or a spatially adjacent top lowest level sub-block or both, motion information of a lowest level sub-block of a first sub-block may be replaced with motion information that is derived by an AMVP mode in a second sub-block.

In FIG. 16, when a current block is divided into two sub-blocks, a first sub-block may perform motion prediction/compensation by using at least one piece of motion information of a merge candidate list, and a second sub-block may derive inter-prediction information by using at least one inter-prediction method of a skip mode, a merge mode, an AMVP mode, motion prediction/compensation using an affine transform equation, bi-directional matching-based motion prediction/compensation, template matching-based motion prediction/compensation, and OBMC-based motion prediction/compensation. Alternatively, a second sub-block may perform motion prediction/compensation by using at least one piece of motion information of a merge candidate list, and a first sub-block may derive inter-prediction information by using at least one inter-prediction method of a skip mode, a merge mode, an AMVP mode, motion prediction/compensation using an affine transform equation, bi-directional matching-based motion prediction/compensation, template matching-based motion prediction/compensation, and OBMC-based motion prediction/compensation.

According to the above-described example, a first sub-block and/or a second sub-block that perform motion prediction/compensation by using at least one piece of motion information of a merge candidate list may derive motion information in a lowest level sub-block unit having a predetermined size.

In FIG. 16C, when a current block is divided into two asymmetric sub-blocks, motion information of a first sub-block may be implicitly derived by using at least one piece of motion information of a merge candidate list.

For example, a first piece of motion information of a merge candidate list for a current block may be derived as motion information of a first sub-block.

For another example, motion information of a first sub-block may be derived by using at least one piece of motion information derived in A0, A1, B0, B1, B2, C3, and H of FIG. 9.

For yet another example, a lowest level sub-block positioned to the left of a first sub-block may derive motion information by using at least one piece of motion information derived in A0, A1, and B2 of FIG. 9. In addition, a lowest level sub-block positioned on top of a first sub-block may derive motion information by using at least one piece of motion information derived in B0, B1, and B2 of FIG. 9.

In FIG. 16, when a current block is divided into two sub-blocks, a first sub-block may perform motion prediction/compensation by using at least one piece of motion information of a motion vector candidate list used in an AMVP, and a second sub-block may derive inter-prediction information by using at least one inter-prediction method of a skip mode, a merge mode, an AMVP mode, motion prediction/compensation using an affine transform equation, bi-directional matching-based motion prediction/compensation, template matching-based motion prediction/compensation, and OBMC-based motion prediction/compensation. Alternatively, a second sub-block may perform motion prediction/compensation by using at least one piece of motion information of a motion vector candidate list used in an AMVP mode, and a first sub-block may derive inter-prediction information by using at least one inter-prediction method of a skip mode, a merge mode, an AMVP mode, motion prediction/compensation using an affine transform equation, bi-directional matching-based motion prediction/compensation, template matching-based motion prediction/compensation, and OBMC-based motion prediction/compensation.

According to the above-described example, a first sub-block and/or a second sub-block that perform motion prediction/compensation by using at least one piece of motion information of a motion vector candidate list used in an AMVP mode may derive motion information in a lowest level sub-block unit having a predetermined size.

In FIG. 16A, when a current block is divided into two asymmetric sub-blocks, motion information of a first sub-block may be implicitly derived by using at least one piece of motion information of a motion vector candidate list used in an AMVP mode.

For example, a first piece of motion information of a motion vector candidate list used in an AMVP mode for a current block may be derived as motion information of a first sub-block.

For another example, motion information of a first sub-block may be derived by using a zero motion vector.

Hereinafter, a method of deriving intra-prediction information between sub-blocks will be described.

When a current block is divided into at least one or more symmetric/asymmetric sub-blocks, each sub-block thus obtained may derive different pieces of intra-prediction information between sub-blocks. Herein, a sub-block of a current block may derive different pieces of intra-prediction information in a lowest level sub-block unit. A lowest level sub-block may mean a smallest block unit having a predetermined size. A 4×4 block size may be defined as a size of a lowest level sub-block.

In FIG. 16, when a current block is divided into two sub-blocks, a first sub-block (or sub-block A) and/or a second sub-block (or sub-block B) may derive intra-prediction information in a lowest level sub-block unit having a predetermined size.

In FIG. 16C, when a first sub-block performs intra prediction by using intra-prediction information of a spatial neighboring block, referring to FIG. 17, motion prediction/compensation of the first sub-block may be performed in a lowest level sub-block unit of the first sub-block and thus may implicitly derive intra-prediction information of a spatially adjacent lowest level sub-block positioned to the left and/or top of the lowest level sub-block as intra-prediction information of the first sub-block. Herein, a size of the lowest level sub-block may be 4×4. Herein, intra-prediction information of a second sub-block may explicitly derive intra-prediction mode information minimizing a distortion value of the second sub-block by using a reference sample adjacent to a current block.

For example, after a prediction block with a size of a current block is generated by using a reference sample adjacent to the current block, a distortion value may derive an intra-prediction mode, where a sum of absolute differences (SAD) and/or a sum of absolute transformed differences (SATD) is minimized only in an actual second sub-block region, as an intra-prediction mode of a second sub-block.

In FIG. 17, an intra-prediction mode of a top left lowest level sub-block among lowest level sub-blocks of a first sub-block may be derived by using intra-prediction mode information of at least one of spatially adjacent left, top and top left lowest level sub-blocks. Herein, intra-prediction mode information of one lowest level sub-block among spatially adjacent left, top and top left lowest level sub-blocks may be used as intra-prediction mode information of a top left lowest level sub-block. Alternatively, intra-prediction mode information for a current lowest level sub-block may be derived by using at least one of an average value, a mode, a weighted sum for intra-prediction modes of up to three lowest level neighboring sub-blocks.

In FIG. 17, intra-prediction mode information of a lowest level sub-block of a first sub-block may be derived by using at least one of spatially adjacent left and/or top lowest level sub-blocks.

In FIG. 17, when intra-prediction mode information is not present in a spatially adjacent left and/or top lowest level sub-block, intra-prediction mode information of a lowest level sub-block of a first sub-block may be derived in a lowest level sub-block adjacent to the spatially adjacent left and/or top lowest level sub-block. The "adjacent" may mean "left" and/or "top".

In FIG. 17, when intra-prediction mode information is not present in a spatially adjacent left and/or top lowest level sub-block, intra-prediction mode information of a lowest level sub-block of a first sub-block may be replaced with intra-prediction mode information that is derived in a second sub-block.

When an intra-prediction block is generated for a first sub-block, after at least one intra-prediction block is generated in a lowest sub-block unit, a final prediction block may be generated by using a weighted sum of prediction blocks.

For example, according to the above-described method, after a prediction block (pred_1) is generated by using an intra-prediction mode that is implicitly derived in a first sub-block in a lowest level sub-block unit, a prediction block (pred_2) may be generated by applying an intra-prediction mode derived in a second sub-block to a lowest level sub-block of the first sub-block. Thus, a prediction block for lowest level sub-blocks of the first sub-block may be generated by using a weighted sum and/or average value of pred_1 and/or pred_2.

Hereinafter, a method of deriving combined intra/inter-prediction information between sub-blocks will be described.

When a current block is divided into at least one or more symmetric and/or asymmetric sub-blocks, each sub-block thus obtained may derive different pieces of intra and/inter-prediction information between sub-blocks. Herein, a sub-block of a current block may derive different pieces of intra and/or inter-prediction information in a lowest level sub-block unit. A lowest level sub-block may mean a smallest block unit having a predetermined size. A 4×4 block size may be defined as a size of a lowest level sub-block.

In FIG. 16, when a current block is divided into two sub-blocks, a first sub-block may derive intra-prediction information, and a second sub-block may derive inter-prediction information.

In FIG. 16, when a current block is divided into two sub-blocks, a first sub-block may derive intra-prediction information in a lowest level sub-block unit, and a second sub-block may derive inter-prediction information.

In FIG. 16, when a current block is divided into two sub-blocks, a first sub-block may derive intra-prediction information, and a second sub-block may derive inter-prediction information in a lowest level sub-block unit.

In FIG. 16, when a current block is divided into two sub-blocks, a first sub-block may derive intra-prediction information in a lowest level sub-block unit, and a second sub-block may derive inter-prediction information also in a lowest level sub-block unit.

In FIG. 16, when a current block is divided into two sub-blocks, a first sub-block may derive inter-prediction information, and a second sub-block may derive intra-prediction information.

In FIG. 16, when a current block is divided into two sub-blocks, a first sub-block may derive inter-prediction information in a lowest level sub-block unit, and a second sub-block may derive intra-prediction information.

In FIG. 16, when a current block is divided into two sub-blocks, a first sub-block may derive inter-prediction information, and a second sub-block may derive intra-prediction information in a lowest level sub-block unit.

In FIG. 16, when a current block is divided into two sub-blocks, a first sub-block may derive inter-prediction information in a lowest level sub-block unit, and a second sub-block may derive intra-prediction information also in a lowest level sub-block unit.

Figure 22:
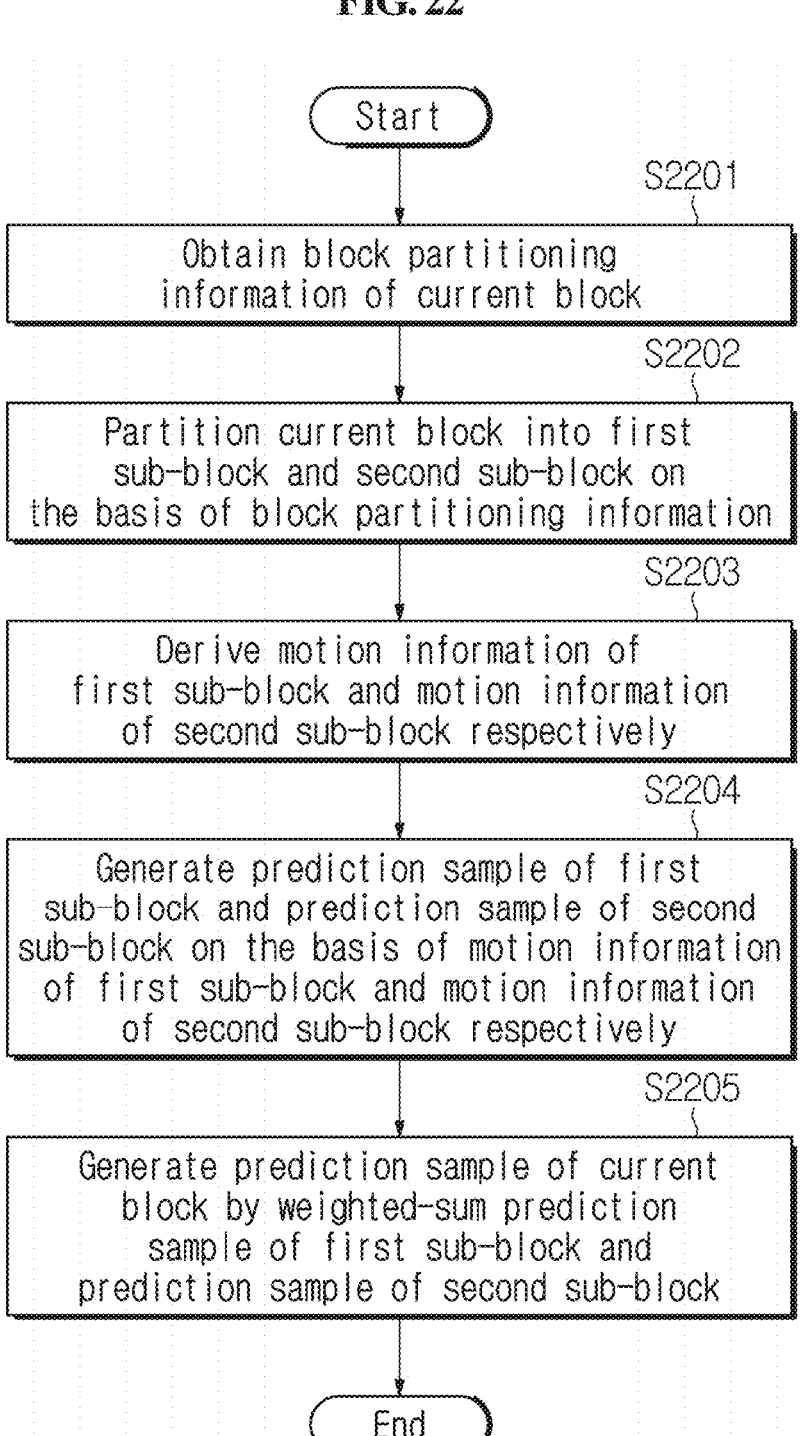
FIG. 22 is a flowchart showing a video decoding method according to an embodiment of the present invention.

FIG. 22 is a flowchart showing a video decoding method according to an embodiment of the present invention.

Referring to FIG. 22, a decoder may obtain block partitioning information of a current block (S2201). Here, the block partitioning information may be index information indicating an index of a table including information indicating a plurality of predefined asymmetric partition shapes.

In addition, a decoder may partition the current block into a first sub-block and a second sub-block on the basis of block partitioning information (S2202).

More particularly, a decoder may partition the current block into a first sub-block and a second sub-block by means of a straight line.

Meanwhile, at least one of angle information and distance information for the straight line may be included in information indicating a plurality of predefined asymmetric partition shapes.

Meanwhile, the first sub-block and the second sub-block may have any one shape among a triangle, a rectangle, a trapezoid, and a pentagon.

Meanwhile, the step S2202 may not be performed when the horizontal length and vertical length of a current block are less than a predetermined threshold respectively.

In addition, a decoder may derive motion information of a first sub-block and motion information of a second sub-block respectively (S2203).

More particularly, a decoder may obtain a merge index of a first sub-block and a merge index of a second sub-block respectively and generate a merge candidate list. In addition, a decoder may derive motion information of a first sub-block by using a merge candidate list and a merge index of the first sub-block and derive motion information of a second sub-block by using a merge candidate list and a merge index of the second sub-block.

Meanwhile, the merge candidate list may be generated based on the current block.

In addition, a decoder may generate a prediction sample of a first sub-block and a prediction sample of a second sub-block on the basis of motion information of the first sub-block and motion information of the second sub-block respectively (S2204).

In addition, a decoder may generate a prediction sample of a current block through a weighted sum of a prediction sample of a first sub-block and a prediction sample of a second sub-block (S2205).

Meanwhile, a decoder may store at least one of the motion information of the first sub-block, the motion information of the second sub-block, and third motion information. Herein, when the motion information of the first sub-block and the motion information of the second sub-block refer to a reference picture in the same direction, the third motion information may be derived as any one of the motion information of the first sub-block and the motion information of the second sub-block.

Figure 23:
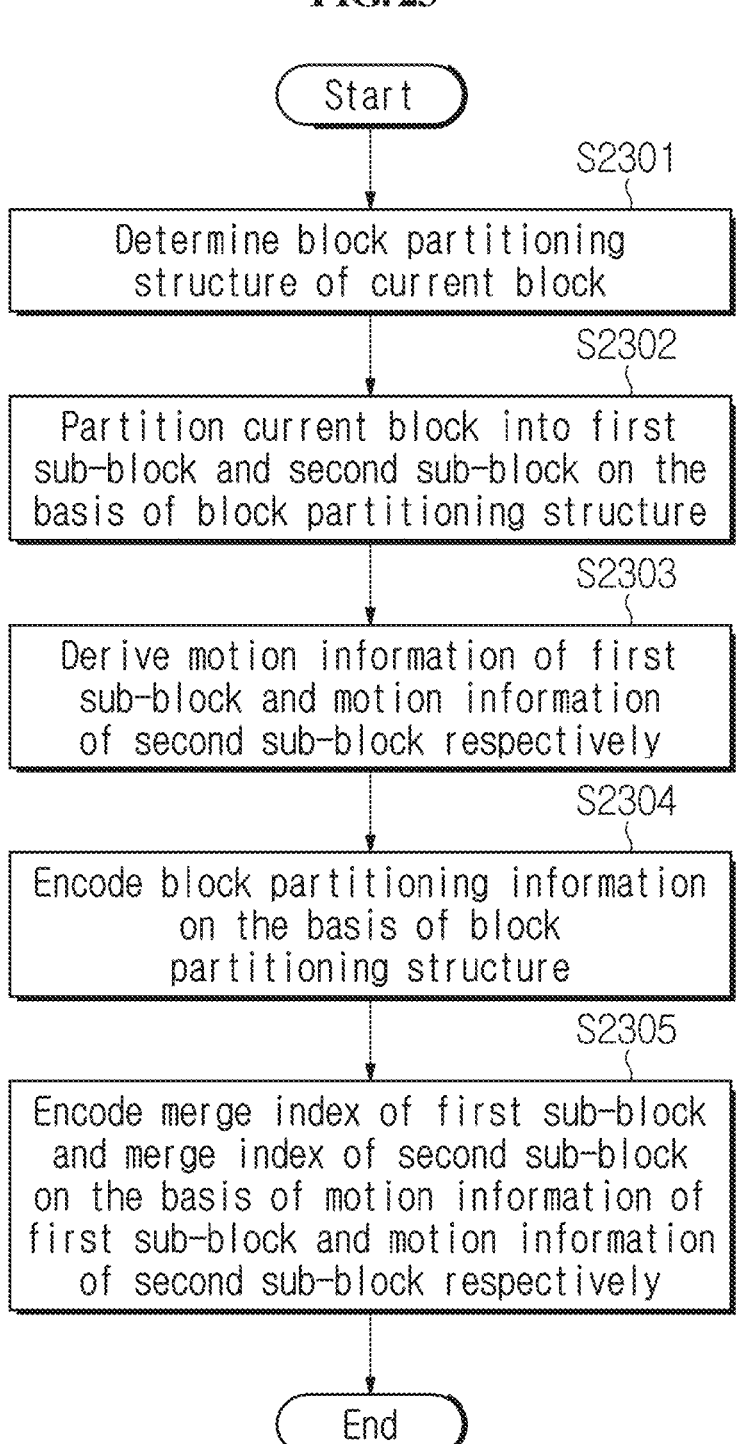
FIG. 23 is a flowchart showing a video encoding method according to an embodiment of the present invention.

FIG. 23 is a flowchart showing a video encoding method according to an embodiment of the present invention.

Referring to FIG. 23, an encoder may determine a block partition structure of a current block (S2301).

In addition, an encoder may partition a current block into a first sub-block and a second sub-block on the basis of a block partition structure (S2302).

More particularly, an encoder may partition a current block into a first sub-block and a second sub-block by means of a straight line.

Meanwhile, at least one of angle information and distance information for the straight line may be included in information indicating a plurality of predefined asymmetric partition shapes.

Meanwhile, the first sub-block and the second sub-block may have any one shape among a triangle, a rectangle, a trapezoid, and a pentagon.

Meanwhile, the step S2302 may not be performed when the horizontal length and vertical length of a current block are less than a predetermined threshold respectively.

In addition, an encoder may derive motion information of a first sub-block and motion information of a second sub-block respectively (S2303).

In addition, an encoder may encode block partitioning information on the basis of a block partition structure (S2304).

Here, the block partitioning information may be index information indicating an index of a table including information indicating a plurality of predefined asymmetric partition shapes.

In addition, an encoder may encode a merge index of a first sub-block and a merge index of a second sub-block on the basis of motion information of the first sub-block and motion information of the second sub-block respectively (S2305).

More particularly, an encoder may generate a merge candidate list. In addition, an encoder may encode a merge index of the first sub-block by using a merge candidate list and the motion information of the first sub-block and encode a merge index of the second sub-block by using a merge candidate list and the motion information of the second sub-block.

Here, the merge candidate list may be generated based on the current block.

Meanwhile, an encoder may store at least one of the motion information of the first sub-block, the motion information of the second sub-block, and third motion information. Herein, when the motion information of the first sub-block and the motion information of the second sub-block refer to a reference picture in the same direction, the third motion information may be derived as any one of the motion information of the first sub-block and the motion information of the second sub-block.

A computer readable non-transitory recording medium according to the present invention may store a bitstream that is generated by the video encoding method described in FIG. 23.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block shape to which the above embodiments of the present invention are applied may have a square shape or a non-square shape.

At least one of the syntax elements (flag, index, etc.) entropy-coded in the encoder and entropy-decoded in the decoder may use at least one of the following binarization, debinarization, entropy encoding/decoding methods.

Truncated Rice binarization
K-th order Exp_Golomb binarization
Limited k-th Exp_Golomb binarization
Fixed-length binarization
Unary binarization
Truncated unary binarization
Truncated binary binarization The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A video decoding method, the method comprising:
obtaining block partitioning information of a current block;
deriving first motion information for a first sub-block of the current block and second motion information for a second sub-block of the current block respectively;
generating a first prediction sample for the first sub-block and a second prediction sample for the second sub-block respectively based on the first motion information and the second motion information;
generating a prediction sample of the current block by weighted-sum of the first prediction sample and the second prediction sample; and
storing at least one of the first motion information for the first sub-block, the second motion information for the second sub-block, and third motion information based on a value of sType,
wherein the block partitioning information is index information indicating an index of a table including information indicating a plurality of predefined asymmetric partition shapes for the first sub-block and the second sub-block,
wherein, in response to the value of sType being 2 and the first motion information and the second motion information referring to a reference picture in a same direction, L1 motion information of the third motion information is set identical to the second motion information for the second sub-block, and L0 motion vector of L0 motion information of the third motion information is set to 0 for horizontal and vertical directions, and L0 reference picture index of the L0 motion information is set to a value of −1, and
wherein the current block is obtained by dividing a current picture including the current block using a quad-tree division method.

2. The video decoding method of claim 1,
wherein the deriving of the first motion information for the first sub-block and the second motion information for the second sub-block respectively comprises:

obtaining a first merge index for the first sub-block and a second merge index for the second sub-block respectively;
generating a merge candidate list;
deriving the first motion information for the first sub-block by using the merge candidate list and the first merge index; and
deriving the second motion information for the second sub-block by using the merge candidate list and the second merge index.

3. The video decoding method of claim 2,
wherein the merge candidate list is generated on the basis of the current block.

4. The video decoding method of claim 1,
wherein the block partitioning information indicates a partitioning line for the first sub-block and the second sub-block.

5. The video decoding method of claim 4,
wherein the information indicating the plurality of predefined asymmetric partition shapes comprises at least one of angle information and distance information for the partitioning line.

6. The video decoding method of claim 1,
wherein the asymmetric partition shape is any one shape of a triangle, a rectangle, a trapezoid, and a pentagon.

7. The video decoding method of claim 1,
wherein the deriving of the first motion information for the first sub-block and the second motion information for the second sub-block respectively is not performed when a horizontal length and a vertical length of the current block are less than respective predetermined thresholds.

8. A video encoding method, the method comprising:
determining a block partitioning structure of a current block;
deriving first motion information for a first sub-block of the current block and second motion information for a second sub-block of the current block respectively;
encoding block partitioning information based on the block partitioning structure; and
encoding a first merge index for the first sub-block and a second merge index for the second sub-block respectively based on the first motion information and the second motion information; and
storing at least one of the first motion information for the first sub-block, the second motion information for the second sub-block, and third motion information based on a value of sType,
wherein the block partitioning information is index information indicating an index of a table including information indicating a plurality of predefined asymmetric partition shapes for the first sub-block and the second sub-block,
wherein, in response to the value of sType being 2 and the first motion information and the second motion information referring to a reference picture in a same direction, L1 motion information of the third motion information is set identical to the second motion information for the second sub-block, and L0 motion vector of L0 motion information of the third motion information is set to 0 for horizontal and vertical directions, and L0 reference picture index of the L0 motion information is set to a value of −1, and
wherein the current block is obtained by dividing a current picture including the current block using a quad-tree division method.

9. The video encoding method of claim 8, wherein the encoding of the first merge index and the second merge index respectively comprises:

generating a merge candidate list;

encoding the first merge index by using the merge candidate list and the first motion information; and encoding the second merge index by using the merge candidate list and the second motion information.

10. The video encoding method of claim 9, wherein the merge candidate list is generated on the basis of the current block.

11. The video encoding method of claim 8, wherein the block partitioning information indicates a partitioning line for the first sub-block and the second sub-block.

12. The video encoding method of claim 11, wherein the information indicating the plurality of predefined asymmetric partition shapes comprises at least one of angle information and distance information for the partitioning line.

13. The video encoding method of claim 8, wherein the asymmetric partition shape is any one shape of a triangle, a rectangle, a trapezoid, and a pentagon.

14. The video encoding method of claim 8, wherein the deriving of the first motion information for the first sub-block and the second motion information for the second sub-block respectively is not performed when a horizontal length and a vertical length of the current block are less than respective predetermined thresholds.

15. A method of transmitting a bitstream generated by a video encoding method, the video encoding method comprising:

determining a block partitioning structure of a current block;

deriving first motion information for a first sub-block of the current block and second motion information for a second sub-block of the current block respectively;

encoding block partitioning information based on the block partitioning structure;

encoding a first merge index for the first sub-block and a second merge index for the second sub-block respectively based on the first motion information and the second motion information; and storing at least one of the first motion information for the first sub-block, the second motion information for the second sub-block, and third motion information based on a value of sType, wherein the block partitioning information is index information indicating an index of a table including information indicating a plurality of predefined asymmetric partition shapes for the first sub-block and the second sub-block, wherein, in response to the value of sType being 2 and the first motion information and the second motion information referring to a reference picture in a same direction, L1 motion information of the third motion information is set identical to the second motion information for the second sub-block, and L0 motion vector of L0 motion information of the third motion information is set to 0 for horizontal and vertical directions, and L0 reference picture index of the L0 motion information is set to a value of −1, and wherein the current block is obtained by dividing a current picture including the current block using a quad-tree division method.

* * * * *